(12) United States Patent
He et al.

(10) Patent No.: US 12,335,571 B2
(45) Date of Patent: Jun. 17, 2025

(54) VIDEO VARIABLE-SPEED PLAYING METHOD AND APPARATUS, AND ELECTRONIC DEVICE AND COMPUTER-READABLE MEDIUM

(71) Applicant: Beijing Bytedance Network Technology Co., Ltd., Beijing (CN)

(72) Inventors: Siyu He, Beijing (CN); Yuanhao Zhang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 201 days.

(21) Appl. No.: 18/010,715

(22) PCT Filed: Jun. 17, 2021

(86) PCT No.: PCT/CN2021/100643
§ 371 (c)(1),
(2) Date: Jun. 27, 2023

(87) PCT Pub. No.: WO2021/254443
PCT Pub. Date: Dec. 23, 2021

(65) Prior Publication Data
US 2023/0336827 A1 Oct. 19, 2023

(30) Foreign Application Priority Data
Jun. 19, 2020 (CN) .......................... 202010567941.9

(51) Int. Cl.
*H04N 5/783* (2006.01)
*H04N 21/472* (2011.01)
(52) U.S. Cl.
CPC ....... *H04N 21/47217* (2013.01); *H04N 5/783* (2013.01)
(58) Field of Classification Search
CPC ............. H04N 21/47217; H04N 5/783
See application file for complete search history.

(56) References Cited

U.S. PATENT DOCUMENTS 7,725,828 B1 * 5/2010 Johnson ............... G11B 27/005
715/721
8,233,772 B1 * 7/2012 Young ................ H04N 5/76
386/282

(Continued)

FOREIGN PATENT DOCUMENTS

CN 102682459 A 9/2012
CN 104967904 A 10/2015

(Continued)

OTHER PUBLICATIONS

International Search Report and Written Opinion in PCT/CN2021/100643, mailed Sep. 15, 2021, 6 pages.
Notice of Allowance in Japanese Patent Application No. 2022-578633, mailed Feb. 13, 2024.
Office Action in European Patent Application No. 21827102.1, mailed Feb. 27, 2024.

(Continued)

*Primary Examiner* — Thai Q Tran
*Assistant Examiner* — Jose M Mesa
(74) *Attorney, Agent, or Firm* — Astute IP Law Group

(57) ABSTRACT

The present disclosure provides a video variable-speed playback method, an apparatus, an electronic device and a computer readable medium, and relates to the field of computer technology. The method includes: in response to a curve variable-speed instruction, acquiring constant-speed presentation timestamps and variable-speed playback speeds of first designated video frames in a video; converting the constant-speed presentation timestamps of the first designated video frames into variable-speed presentation timestamps; establishing a speed variation curve; fitting the speed variation curve into one or more straight line segments; based on a second designated video frame indicated by a variable-speed playback instruction, determining a corresponding constant-speed presentation timestamp; and (Continued)

determining a corresponding variable-speed presentation timestamp, and starting from the variable-speed presentation timestamp, playing the video at a variable-speed. The present disclosure can realize video variable-speed playback from any video frame during preview.

20 Claims, 8 Drawing Sheets

(56) References Cited

U.S. PATENT DOCUMENTS

| | | | | |
|---|---|---|---|---|
| 8,295,687 | B1* | 10/2012 | Kuspa | G11B 27/034 |
| | | | | 386/282 |
| 2005/0207733 | A1 | 9/2005 | Gargi | |
| 2008/0235583 | A1* | 9/2008 | Ostergaard | G11B 27/005 |
| | | | | 386/343 |
| 2010/0119214 | A1 | 5/2010 | Shimazaki et al. | |
| 2010/0275121 | A1 | 10/2010 | Johnson | |
| 2012/0141090 | A1 | 6/2012 | Evans et al. | |
| 2014/0123195 | A1 | 5/2014 | Han et al. | |

FOREIGN PATENT DOCUMENTS

| | | |
|---|---|---|
| CN | 107888948 A | 4/2018 |
| CN | 108156500 A | 6/2018 |
| CN | 108574874 A | 9/2018 |
| CN | 109309870 A | 2/2019 |
| CN | 110771175 A | 2/2020 |
| EP | 3595324 A1 | 1/2020 |
| IN | 553876 | 11/2024 |
| JP | 2004040791 A | 2/2004 |
| JP | 2006023748 A | 1/2006 |
| JP | 2009268129 A | 11/2009 |

OTHER PUBLICATIONS

Yamaguchi Ryosuke, the "Final Cut Studio 2 super reference for Macintosh", the 1st edition, and Sotec Co., Ltd. Yanagisawa Junichi, Nov. 20, 2007, pp. 230-238, with English translation.
Extended European Search Report for European Application No. 21827102.1, mailed on Jul. 6, 2023, 15 Pages.
Communication pursuant to Article 94(3) EPC for European Patent Application No. 21827102.1, mailed on Oct. 2, 2024, 5 pages.

* cited by examiner

VIDEO VARIABLE-SPEED PLAYING METHOD AND APPARATUS, AND ELECTRONIC DEVICE AND COMPUTER-READABLE MEDIUM

This is a national stage application filed under 35 U.S.C. § 371 based on International Patent Application No. PCT/CN2021/100643, filed Jun. 17, 2021, which claims priority of Chinese Patent Application No. 202010567941.9, filed on Jun. 19, 2020, the disclosures of which are incorporated herein by reference in their entireties.

TECHNICAL FIELD

The present disclosure relates to the field of computer technology, and in particular, the present disclosure relates to a video variable-speed playback method, an apparatus, an electronic device and a computer-readable medium.

BACKGROUND

With the development of science and technology, the editing functions of video are more and more diversified. At present, video editing also supports curve variable-speed. Curve variable-speed editing refers to setting a variable-speed for a certain video frame of a video. In the editing, a preset curve variable-speed template can be used, or a video frame which needs to have a variable-speed and the speed variation thereof can be customized. Before subject to curve variable-speed editing, each video frame in the video has a corresponding constant-speed presentation timestamp and a constant-speed playback speed; after subject to curve variable-speed editing, each video frame in the video has a corresponding variable-speed presentation timestamp and a variable-speed playback speed.

SUMMARY

This Summary section is provided to introduce concepts in a simplified form that are described in detail in the Detailed Description section that follows. This Summary section is not intended to identify key features or essential features of the claimed technical solution, nor is it intended to be used to limit the scope of the claimed technical solution.

A first aspect of the present disclosure provides a video variable-speed playback method, which includes: in response to a curve variable-speed instruction, acquiring constant-speed presentation timestamps and variable-speed playback speeds of first designated video frames in a video; converting the constant-speed presentation timestamps of the first designated video frames into variable-speed presentation timestamps; establishing a speed variation curve based on an association relationship between the variable-speed presentation timestamps and the variable-speed playback speeds of the first designated video frames; fitting the speed variation curve into one or more straight line segments; based on a second designated video frame indicated by a variable-speed playback instruction, determining a constant-speed presentation timestamp of the second designated video frame; and based on the constant-speed presentation timestamp of the second designated video frame and the one or more straight line segments, determining a variable-speed presentation timestamp of the second designated video frame, and starting from the variable-speed presentation timestamp, playing the video at a variable-speed; the variable-speed presentation timestamp of the second designated video frame is determined by an inverse function of an integral function of a first straight line segment, and the first straight line segment is a straight line segment, where the variable-speed presentation timestamp of the second designated video frame is located, of the one or more straight line segments.

A second aspect of the present disclosure provides a video variable-speed playback apparatus, which includes: an acquisition module, configured to, in response to a curve variable-speed instruction, acquire constant-speed presentation timestamps and variable-speed playback speeds of respective first designated video frames in a video; a conversion module, configured to convert the constant-speed presentation timestamps of the first designated video frames into variable-speed presentation timestamps; an establishment module, configured to establish a speed variation curve based on an association relationship between the variable-speed presentation timestamps and the variable-speed playback speeds of the first designated video frames; a fitting module, configured to fit the speed variation curve into one or more straight line segments; a determination module, configured to, based on a second designated video frame indicated by a variable-speed playback instruction, determine a constant-speed presentation timestamp of the second designated video frame; and a playback module configured to, based on the constant-speed presentation timestamp of the second designated video frame and the one or more straight line segments, determine a variable-speed presentation timestamp of the second designated video frame, and starting from the variable-speed presentation timestamp, play the video at a variable-speed; the variable-speed presentation timestamp of the second designated video frame is determined by an inverse function of an integral function of a first straight line segment, and the first straight line segment is a straight line segment, where the variable-speed presentation timestamp of the second designated video frame is located, of the one or more straight line segments.

A third aspect of the present disclosure provides a video variable-speed playback apparatus, which includes: a memory and a processor; a computer program is stored in the memory; the processor is configured to execute the method of the first aspect when running the computer program.

A fourth aspect of the present disclosure provides a computer-readable medium, on which a computer program is stored, wherein the method of the first aspect is implemented in a case where the computer program is executed by a processor.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the originals and elements are not necessarily drawn to scale.

DETAILED DESCRIPTION

Figure 1:
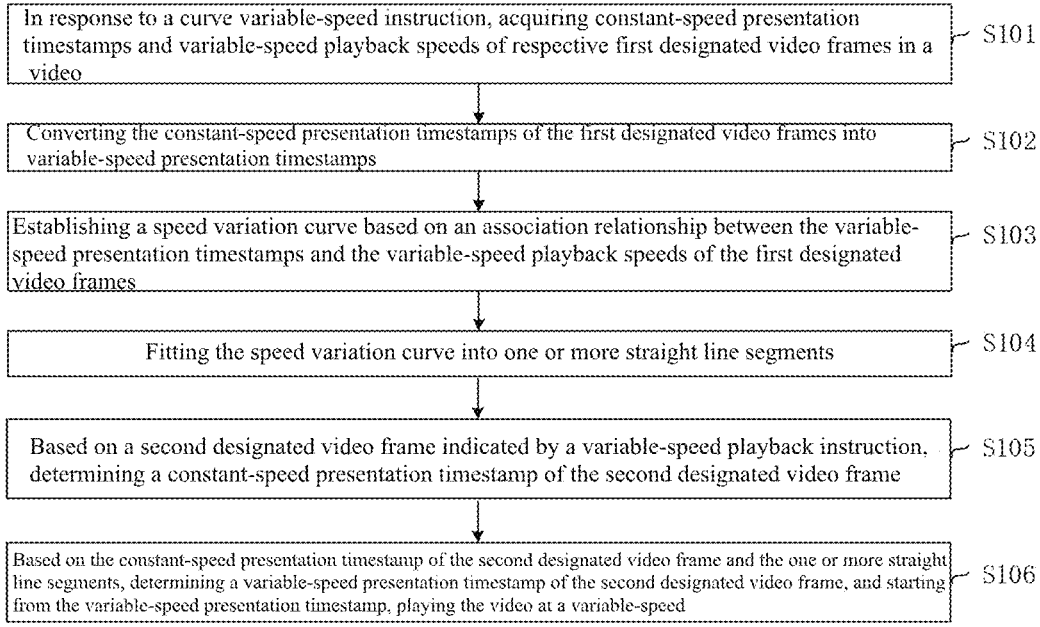
FIG. 1 a flowchart of a first video variable-speed playback method provided by an embodiment of the present disclosure.

Embodiments of the present disclosure will be described in more detail below with reference to the accompanying drawings. While certain embodiments of the present disclosure are shown in the drawings, it should be understood that the present disclosure can be embodied in various forms and should not be construed as limited to the embodiments set forth herein, but rather are provided for the purpose of a more thorough and complete understanding of the present disclosure. It should be understood that the drawings and embodiments of the present disclosure are only for exemplary purposes, and are not intended to limit the protection scope of the present disclosure.

It should be understood that the various steps described in the method embodiments of the present disclosure can be performed in different orders and/or in parallel. Furthermore, method embodiments can include additional steps and/or skip illustrated steps. The scope of the present disclosure is not limited in this regard.

As used herein, the term "including" and variations thereof are open-ended inclusions, i.e., "including but not limited to." The term "based on" is "based at least in part on." The term "one embodiment" means "at least one embodiment;" the term "another embodiment" means "at least one further embodiment;" the term "some embodiments" means "at least some embodiments." Relevant definitions of other terms will be given in the description below.

It should be noted that the concepts such as "first" and "second" mentioned in the present disclosure are only used to distinguish devices, modules or units, are not used to limit these devices, modules or units to be different devices, modules or units, and are not intended to limit the order or interdependence of the functions performed by these devices, modules or units.

It should be noted that the modifications of "a" and "a plurality" mentioned in the present disclosure are illustrative rather than restrictive, and those skilled in the art should understand that unless the context clearly indicates otherwise, they should be understood as "one or more."

The names of messages or information exchanged between a plurality of devices in the embodiments of the present disclosure are only for illustrative purposes, and are not intended to limit the scope of such messages or information.

In the related art, when previewing a video which has been subject to curve variable-speed editing, because constant-speed presentation timestamps of respective video frames cannot accurately correspond to variable-speed presentation timestamps, the video cannot be played starting from any video frame, resulting in poor user experience.

The beneficial effects brought by the technical solutions provided by the present disclosure are as follows.

In the present disclosure, in response to a curve variable-speed instruction, constant-speed presentation timestamps and variable-speed playback speeds of respective first designated video frames in a video are acquired; the constant-speed presentation timestamps of the first designated video frames are converted into variable-speed presentation timestamps; establishing a speed variation curve based on an association relationship between the variable-speed presentation timestamps and the variable-speed playback speeds of the first designated video frames; fitting the speed variation curve into one or more straight line segments; based on a second designated video frame indicated by a variable-speed playback instruction, determining a constant-speed presentation timestamp of the second designated video frame; based on the constant-speed presentation timestamp of the second designated video frame and the one or more straight line segments, determining a variable-speed presentation timestamp of the second designated video frame, and starting from the variable-speed presentation timestamp, playing the video at a variable-speed, wherein the variable-speed presentation timestamp of the second designated video frame is determined by an inverse function of an integral function of a first straight line segment, and the first straight line segment is a straight line segment of the one or more straight line segments where the variable-speed presentation timestamp of the second designated video frame is located. Specifically, in the present disclosure, by fitting the speed variation curve into one or more straight line segments, because the straight line segment is a linear function, when determining a constant-speed presentation timestamp of the second designated video frame based on the second designated video frame indicated by the variable-speed playback instruction, by utilizing a property of inversion of a first-order integral function, based on the constant-speed presentation timestamp of the second designated video frame and one or more straight line segments, the variable-speed presentation timestamp of the second designated video frame is determined, that is, a mapping relationship between the constant-speed presentation timestamp and the variable-speed presentation timestamp of the second designated video frame is formed, which enables the constant-speed presentation timestamp to accurately correspond to the variable-speed presentation timestamp, so that after the video is subject to curve variable-speed editing, the preview process can play the video at a variable-speed starting from any video frame, which is beneficial to improve the experience in video editing.

In order to make the objectives, technical solutions and advantages of the present disclosure clearer, the embodiments of the present disclosure will be further described in detail below with reference to the accompanying drawings.

First, several terms involved in the present disclosure are introduced and explained.

For a First designated video frame, a video generally includes a series of video frames. Upon receiving a curve variable-speed instruction, each first designated video frame in the acquired video can be a video frame corresponding to each speed variation position in a preset template for curve variable-speed editing, a randomly selected video frame in the video, or a user-selected video frame when performing a curve variable-speed editing.

For a constant-speed presentation timestamp, a variable-speed presentation timestamp, each video frame has a corresponding constant-speed presentation timestamp (PTS) parameter, which indicates a display time for the original video frame obtained after decoding the compressed frame. In the embodiments, the constant-speed presentation timestamp can be understood as a normal-speed presentation timestamp, which represents a timestamp corresponding to each video frame before the video is edited. Compared with the constant-speed presentation timestamp, the variable-speed presentation timestamp represents a timestamp corresponding to each video frame in the video which have been subject to curve variable-speed editing (due to editing the playback speed of a certain frame or multiple video frames in the video, after editing, each video frame will have a variable-speed presentation timestamp that is different from the constant-speed presentation timestamp).

For a second designated video frame, during the preview process after the curve variable-speed editing, a certain video frame can be selected starting from which to play at a variable-speed to preview a video effect after the curve variable-speed editing. The selected video frame is the second designated video frame.

The technical solutions of the present disclosure and how the technical solutions of the present disclosure solve the above-mentioned technical problems will be described in detail below with specific examples. The following specific embodiments can be combined with each other, and the same or similar concepts or processes can not be repeated in some embodiments. The embodiments of the present disclosure will be described below with reference to the accompanying drawings.

Referring to FIG. 1, the present disclosure provides a video variable-speed playback method. The method can be specifically performed by an electronic device according to an embodiment of the present disclosure. Specifically, the electronic device can be a mobile terminal, a PC (personal computer) or any device that supports interface interaction. The present disclosure includes:

S101, in response to a curve variable-speed instruction, acquiring constant-speed presentation timestamps and variable-speed playback speeds of respective first designated video frames in a video;

S102, converting the constant-speed presentation timestamps of the first designated video frames into variable-speed presentation timestamps;

S103, establishing a speed variation curve based on an association relationship between the variable-speed presentation timestamps and the variable-speed playback speeds of the first designated video frames;

S104, fitting the speed variation curve into one or more straight line segments;

S105, based on a second designated video frame indicated by a variable-speed playback instruction, determining a constant-speed presentation timestamp of the second designated video frame;

S106, based on the constant-speed presentation timestamp of the second designated video frame and the one or more straight line segments, determining a variable-speed presentation timestamp of the second designated video frame, and starting from the variable-speed presentation timestamp, playing the video at a variable-speed.

The variable-speed presentation timestamp of the second designated video frame is determined by an inverse function of an integral function of a first straight line segment, and the first straight line segment is a straight line segment, where the variable-speed presentation timestamp of the second designated video frame is located, of the one or more straight line segments.

Figure 7:
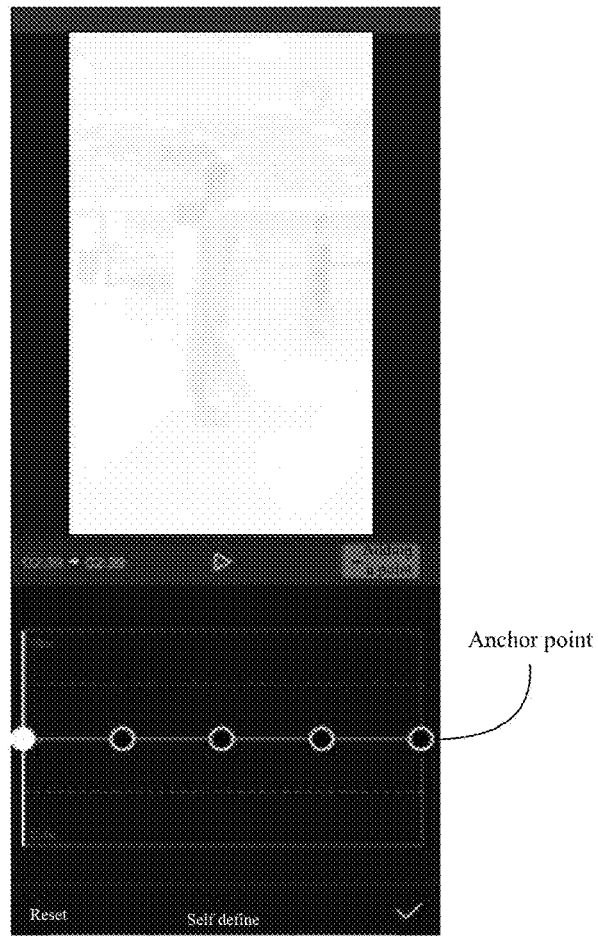
FIG. 7 is a schematic diagram of a to-be-edited video in a video variable-speed playback method provided by an embodiment of the present disclosure.
Figure 8:
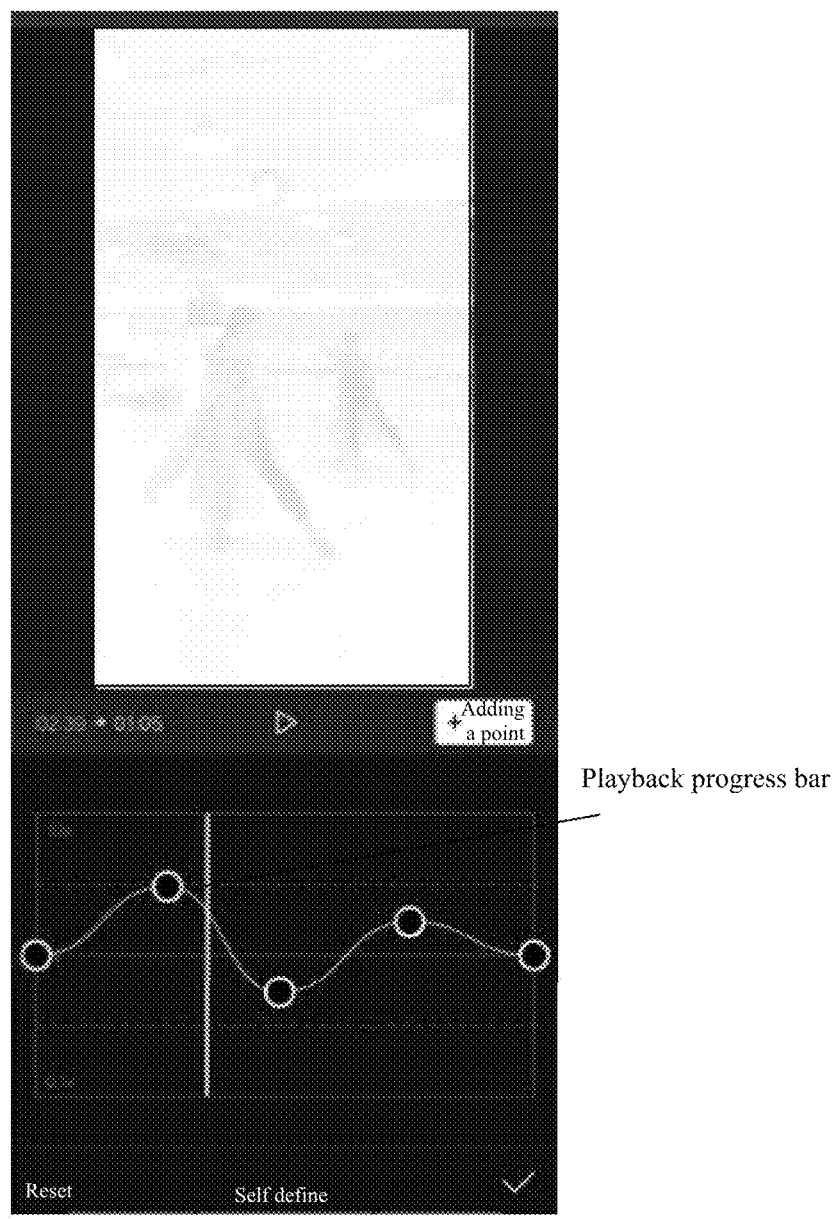
FIG. 8 is a schematic diagram of a preview process after a video is subject to curve variable-speed editing in a video variable-speed playback method provided by an embodiment of the present disclosure.

In step S101, in response to a curve variable-speed instruction, constant-speed presentation timestamps and variable-speed playback speeds of respective first designated video frames in the video are obtained. For example, in video editing, a to-be-edited video is acquired, and the initial playback speed of the to-be-edited video is 1×speed by default (the video is played at a normal speed, and the playback speed of each video frame in the video is the same, which is referred to as constant-speed playback speed in this embodiment). For example, the playback speed of each video frame in the to-be-edited video can be different. For example, the acquired to-be-edited video is a video which has been subject to conventional variable-speed editing (accelerating or decelerating the video as a whole) or curve variable-speed editing. In this case, the playback speed of each video frame can be different, which is referred to as constant-speed playback speed in this embodiment. Upon receiving a curve variable-speed instruction, in response to the curve variable-speed instruction, the constant-speed presentation timestamps and the variable-speed playback speeds of respective first designated video frames in the video are acquired. The constant-speed presentation timestamps and the variable-speed playback speeds corresponding to the first designated video frames can be read from the curve variable-speed instruction, and the curve variable-speed instruction includes an instruction initiated by a user on a terminal, and also includes instructions received from other terminals or servers. When an instruction initiated by the user is included, the user can initiate a curve variable-speed instruction by selecting a certain video frame on a display interface as the first designated video frame and adjusting the playback speed. Referring to FIG. 7 and FIG. 8, FIG. 7 is a display interface for entering the curve variable-speed editing after acquiring the to-be-edited video.

Before initiating the curve variable-speed instruction, several preset video frames can be provided for the user to adjust the playback speed thereof. Referring to an anchor point shown in FIG. 7, the user can adjust the playback speed of the video frame corresponding to the anchor point by dragging the anchor point. Further, the user can also adjust the playback speed of the designated video frame by adding or deleting anchor points. In this process, after the user adjusts the playback speed of the first designated video frame by means of the anchor point, the curve variable-speed instruction is initiated. The electronic device will respond to the curve variable-speed instruction to acquire the constant-speed presentation timestamps and the variable-speed playback speeds of respective first designated video frames in the video. The constant-speed presentation timestamp is a presentation timestamp of the first designated video frame corresponding to the current anchor point before the curve variable-speed editing, and the variable-speed playback speed is a playback speed adjusted by the user. In an embodiment, every time an adjustment of the playback speed is performed for one of the first designated video frames, a curve variable-speed instruction is immediately initiated, that is, the preview process is simultaneously entered (for example, the playback speed is adjusted for three of the first designated video frames, then three curve variable-speed instructions will be included). It is also possible to initiate a curve variable-speed instruction after completing the curve variable-speed editing of the entire video, such as using a preset curve variable-speed template, or after the user adjusts the playback speed of a plurality of first designated video frames, the preview process is entered by the user triggering a control to initiate a curve variable-speed instruction.

In step S102, the constant-speed presentation timestamps of the first designated video frames are converted into variable-speed presentation timestamps. For example, the playback speed of each video frame can be different after the curve variable-speed is performed, so the playback time of each video frame after the curve variable-speed will be different from the original corresponding constant-speed presentation timestamp. In this regard, the constant-speed presentation timestamp needs to be converted into a variable-speed presentation timestamp for subsequent steps to perform processing based on the variable-speed presentation timestamps of the first designated video frames.

In step S103, a speed variation curve is established based on an association relationship between the variable-speed presentation timestamps and the variable-speed playback speeds of the first designated video frames. For example, based on the variable-speed presentation timestamps of the first designated video frames determined in step S102 and the variable-speed playback speeds of the first designated video frames determined in step S101, a speed variation curve is established, and the speed variation curve represents the speed variation of each video frame in the video.

In step S104, the speed variation curve is fitted into one or more straight line segments. For example, when one or more straight line segments are used to fit the speed variation curve, the fitting can be performed for the entire speed variation curve, or for each curve interval in the speed variation curve, where each curve interval is determined from variable-speed presentation timestamps corresponding to two adjacent first designated video frames. When fitting the entire speed variation curve, the speed variation curve can be fitted into one or more straight line segments. When fitting each curve interval in the speed variation curve, the curve interval corresponding to each curve interval can be fitted into one or more straight line segments. Any straight line segment of the fitted speed variation curve can be determined from two fitting points or more than two fitting points, wherein the fitting point can be located on the speed variation curve (belonging to a certain point on the speed variation curve), or outside the speed curve.

In step S105, based on a second designated video frame indicated by a variable-speed playback instruction, a constant-speed presentation timestamp of the second designated video frame is determined. For example, the variable-speed playback instruction can be triggered after step S104, that is, the variable-speed playback instruction can be triggered after the speed variation curve is fitted. At this time, the second designated video frame indicated by the variable-speed playback instruction is a first video frame in the video. The variable-speed playback instruction also includes an instruction initiated when a preview playback is triggered after the user selects a certain video frame in the preview process, and at this time, a certain video frame selected by the user is the second designated video frame. Because the variable-speed presentation timestamp corresponding to each video frame has not been generated during preview, upon receiving the variable-speed playback instruction, the corresponding constant-speed presentation timestamp can be determined based on the second designated video frame indicated by the variable-speed playback instruction.

In S106, based on the constant-speed presentation timestamp of the second designated video frame and the one or more straight line segments, a variable-speed presentation timestamp of the second designated video frame is determined, and starting from the variable-speed presentation timestamp, the video is played at a variable-speed. The variable-speed presentation timestamp of the second designated video frame is determined by an inverse function of an integral function of a first straight line segment, and the first straight line segment is a straight line segment of the one or more straight line segments where the variable-speed presentation timestamp of the second designated video frame is located. Specifically, because only the constant-speed presentation timestamp of the second designated video frame is known during the preview, in order to play the video playback at a variable-speed starting from the second designated video frame, it is necessary to determine the variable-speed presentation timestamp of the second designated video frame. In the embodiments of the present disclosure, the first straight line segment where the variable-speed presentation timestamp is located is determined by using the constant-speed presentation timestamp of the second designated video frame, so as to determine the variable-speed presentation timestamp based on the inverse function of the integral function of the first straight line segment.

In the present disclosure, by fitting the speed variation curve into one or more straight line segments, because the straight line segment is a linear function, when the constant-speed presentation timestamp of the second designated video frame is determined based on the second designated video frame indicated by the variable-speed playback instruction; by utilizing the property of inversion of a first-order integral function, based on the constant-speed presentation timestamp of the second designated video frame and the one or more straight line segments, the variable-speed presentation timestamp of the second designated video frame is determined, that is, to form a mapping relationship between the constant-speed presentation timestamp and the variable-speed presentation timestamp of the second designated video frame. It enables the constant-speed presentation timestamp to accurately correspond to the variable-speed presentation timestamp, so that after the video is subject to curve variable-speed editing, the preview process can play the video at a variable-speed starting from any video frame, which is beneficial to improve the experience in video editing.

Through the above steps S101, S102, and S103, the function of curve variable-speed can be realized, and considering that after the curve variable-speed editing, before generating or exporting the video, a preview process is provided. The constant-speed presentation timestamp of the second designated video frame indicated by the playback instruction accurately corresponds to the variable-speed presentation timestamp, so that the video can be played starting from any video during preview.

Figure 2:
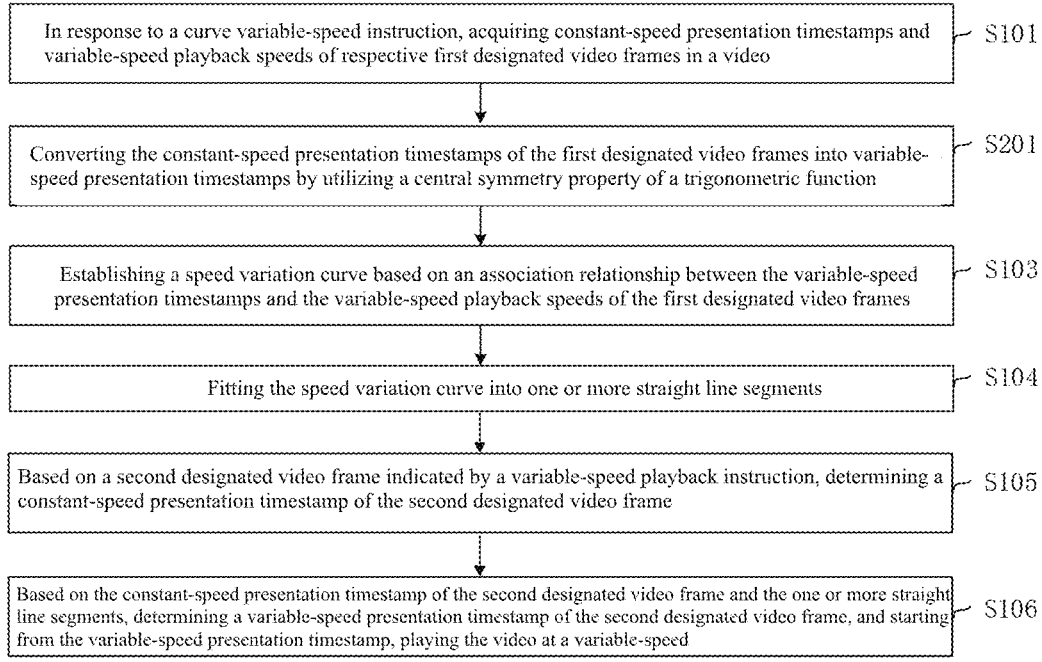
FIG. 2 is a flowchart of a second video variable-speed playback method provided by an embodiment of the present disclosure.

Referring to FIG. 2, in an embodiment, the step S102 of converting the constant-speed presentation timestamps of the first designated video frames into variable-speed presentation timestamps includes:

Step S201, converting the constant-speed presentation timestamps of the first designated video frames into variable-speed presentation timestamps by utilizing a central symmetry property of a trigonometric function.

For example, by utilizing a central symmetry property of a trigonometric function, the constant-speed presentation timestamps of the first designated video frames are converted to the variable-speed presentation timestamps, the constant-speed presentation timestamps can be quickly converted into the variable-speed presentation timestamps. The process of converting a constant-speed presentation timestamp to a variable-speed presentation timestamp based on the central symmetry property of the trigonometric function can be understood as an integration process of playback speed with respect to the timestamp. Specifically, the embodiment of the present disclosure adopts the following conversion formula to convert the timestamp:

$$pointsTimeline[i]' \cdot \left(\frac{pointsV(i) + pointsV(i-1)}{2}\right) = pointsSrc[i] - pointsSrc[i-1]$$

$$SumTimeline = pointsTimeline[1]' + \ldots\ldots + pointsTimeline[N-1]'$$

$$pointsTimeline[i] = \frac{\sum_{j=1}^{i} pointsTimeline[j]'}{sumTimeline}; i \in [1, N-1]$$

where pointsSrc [i] denotes a constant-speed presentation timestamp of the (i+1)th frame in the first designated video frames, points Time line [i] denotes a variable-speed presentation timestamp of the (i+1)th frame in the first designated video frames, pointsV [i] denotes a variable-speed playback speed of the (i+1)th frame in the first designated video frames, SumTimeline denotes a total playback duration of the video after speed variation, and N denotes a frame number of the first designated video frames.

Figure 9:
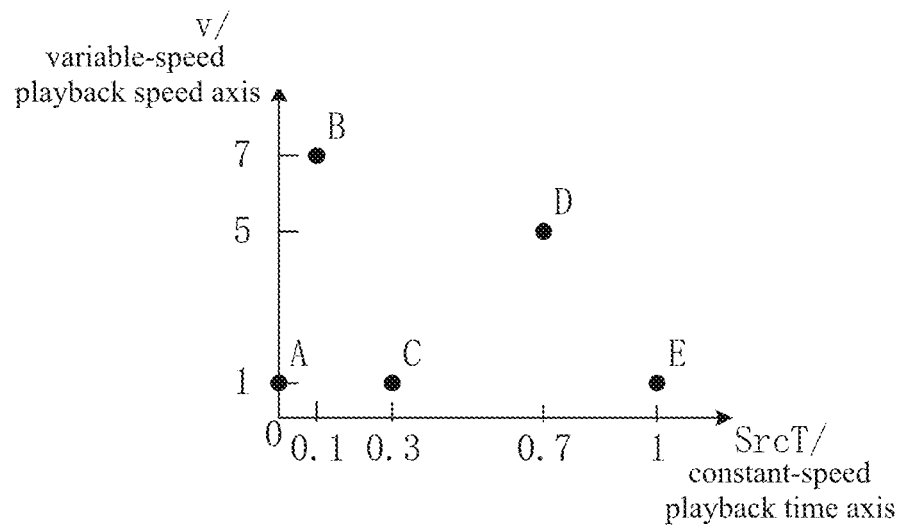
FIG. 9 is a schematic diagram of a position of each video frame included in first designated video frames in a video variable-speed playback method provided by an embodiment of the present disclosure.

Referring FIG. 9, for example, in Example 1, assuming that the first designated video frames include 5 frames (N=5), the corresponding relationship between the constant-speed presentation timestamps and the variable-speed playback speeds of respective first designated video frames is as follows: A(0,1), B(0.1,7), C(0.3,1), D(0.7,5) and E(1,1). After conversion, the corresponding relationship between the constant-speed presentation timestamps and the variable-speed playback speeds of respective first designated video frames is as follows: a(0,1), b(0.081,7), c(0.243,1), d(0.675,5) and e(1,1). In the embodiments of the present disclosure, normalization is performed on the constant-speed presentation timestamps and the variable-speed presentation timestamps of respective first designated video frames. Because the first designated video frame A(0,1) is the first frame of the video, its constant-speed presentation timestamp is equal to the variable-speed presentation timestamp, and no conversion is required, that is, A(0,1)=a(0,1). On the speed variation curve, the integral of the variable-speed playback speed with respect to the variable-speed presentation timestamp is the constant-speed presentation timestamp Src=\V·dtimeline Referring to FIG. 10, in an embodiment, the speed variation curve between two adjacent video frames in the first designated video frames is a segment of trigonometric function curve established based on the association relationship between the variable-speed presentation timestamps and the variable-speed playback speeds of the two adjacent video frames.

The trigonometric function curve can be a sinusoidal function curve, a cosinusoidal function curve, etc., and a sinusoidal function curve is preferred in the embodiment of the present disclosure. In an embodiment, the sinusoidal function curve represents the speed variation of the video when the video is played at a curve variable-speed. The amplitude of each segment of the sinusoidal function curve is half of a speed difference between adjacent anchor points, the angular velocity is x times of a time difference between adjacent anchor points, the offset distance is a mean value of velocities of the adjacent anchor points, and the initial phase is a product of a negative value of a mean value of times of the adjacent anchor points and the angular velocity.

In the embodiments of the present disclosure, the sinusoidal function curve can be represented as y=A sin(ωx+φ)+k, which is defined as a figure of the function on a rectangular coordinate system, sin is a symbol of a sinusoidal function, x denotes a value (variable-speed presentation timestamp) on the x-axis of the rectangular coordinate system, and y denotes a value (variable-speed playback speed) on the y-axis of the rectangular coordinate system, A denotes an amplitude expressed as half of the velocity difference between adjacent anchor points, o denotes an angular velocity expressed as π times of the time difference between adjacent anchor points, q denotes an initial phase expressed by a product of a negative value of a mean value of times of adjacent anchor points and the angular velocity, and k denotes an offset expressed by a mean value of velocities of adjacent anchor points.

The sinusoidal function curve can be expressed as:

$$y_i = \frac{\Delta v}{2} \sin\left(\frac{\pi}{\Delta t}(x - \bar{t})\right) + \bar{v}, i \in [1, N-1];$$

$$\Delta v = v_{i+1} - v_i, \Delta t = t_{i+1} - t_i, \bar{t} = \frac{t_i + t_{i+1}}{2}, \bar{v} = \frac{v_i + v_{i+1}}{2}$$

where $y_i$ denotes an i-th segment of a sinusoidal function curve corresponding to an i-th frame to an (i+1)th frame in the first designated video frames, Δv denotes a difference between the variable-speed playback speeds of the (i+1)th frame and the i-th frame in the first designated video frames, Δt denotes a variable-speed playback time difference between the (i+1)th frame and the i-th frame in the first designated video frames (the time step is between the (i+1)th frame and the i-th frame), t denotes a mean value of variable-speed playback times of the i-th frame and the (i+1)th frame in the first designated video frames, V denotes a mean value of the variable-speed playback speeds of the i-th frame and the (i+1)th frame in the first designated video frames, and N is a number of video frames included in the first designated video frames.

In an embodiment, a derivative of the speed variation curve at a position representing the first designated video frame is zero.

For example, a derivative of the speed variation curve at the position of the first designated video frame is zero (the variable-speed presentation timestamp corresponding to the first designated video frame is start and end times of an interval $[\pi/2(2k-1), \pi/2(2+1)]$).

For example, the center symmetric sinusoidal function curve is used to build a speed variation curve with smooth transitions, which can make the speed variation smooth when implementing the curve variable-speed playback of the video, avoid a sudden change of the speed, and improve the user experience.

Figure 10:
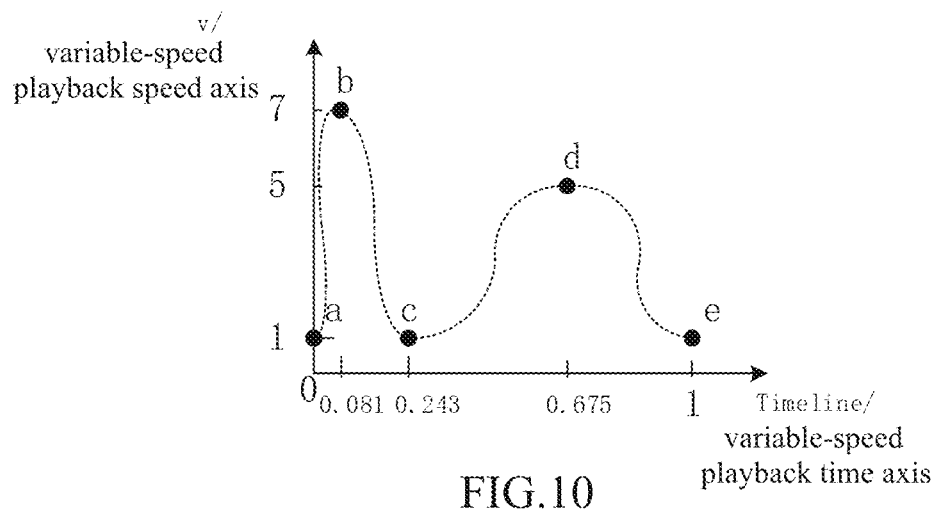
FIG. 10 is a schematic diagram of a position of a first designated video frame after a constant-speed presentation timestamp of the first designated video frame is converted into a variable-speed presentation timestamp in a video variable-speed playback method provided by an embodiment of the present disclosure.

Referring to FIG. 10, in conjunction with Example 1, it can be seen from FIG. 10 that a curve interval of a segment of a sinusoidal function curve is determined by variable-speed presentation timestamps of two adjacent video frames in the first designated video frames. For example, when the first designated video frames include 5 frames, there are totally four segments of sinusoidal function curves with center symmetry.

Figure 3:
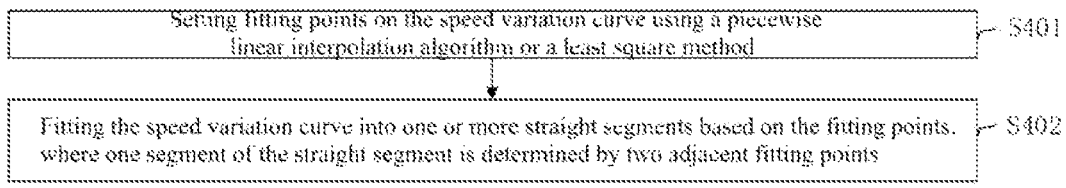
FIG. 3 is a flowchart of a third video variable-speed playback method provided by an embodiment of the present disclosure.
Figure 11:
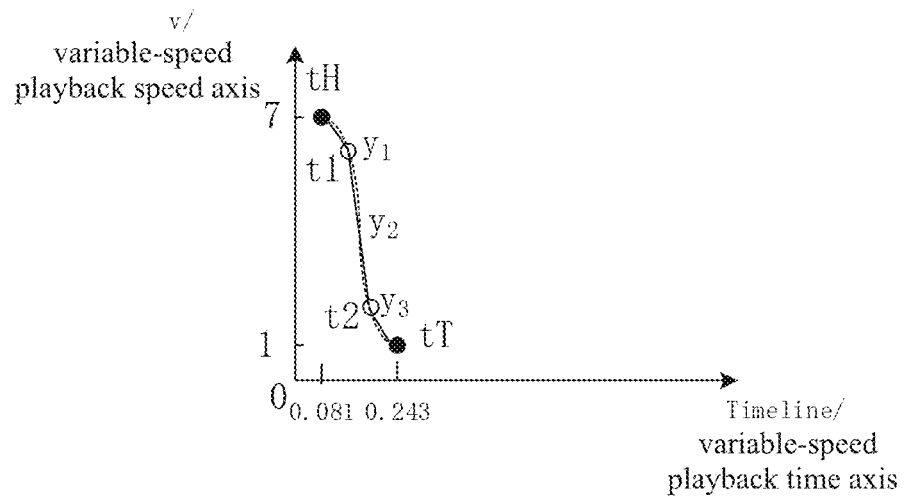
FIG. 11 is a schematic diagram of fitting a speed variation curve into a plurality of straight line segments in a video variable-speed playback method provided by an embodiment of the present disclosure.

Referring to FIG. 3 and FIG. 11, in an embodiment, fitting the speed variation curve into one or more straight line segments includes:

Step S301, setting fitting points on the speed variation curve using a piecewise linear interpolation algorithm or a least square method;

Step S302, fitting the speed variation curve into one or more straight segments based on the fitting points, where one segment of the straight segment is determined by two adjacent fitting points.

For example, before fitting the speed variation curve, a preset number of straight line segments and a fitting coefficient of the curve are set. The preset number of straight line segments is related to a fitting degree. Under the same trigonometric function curve, the large the number of straight line segments is, the higher the fitting degree will be. The preset number of straight line segments can be a default value or a value adjusted by the user. In an embodiment, the preset number of polyline segments is 3, that is, three straight lines are used to fit the trigonometric function curve. The fitting coefficient is related to the variation of the fitted trigonometric function curve and the number of straight line segments.

When the piecewise linear interpolation algorithm is used to fit the speed variation curve into one or more straight line segments, for each segment of the trigonometric function curve constituting the speed variation curve, based on the preset number of straight line segments and the fitting coefficient, a corresponding number of interpolation nodes are taken in an interval where the trigonometric function curve is located. Based on a to-be-determined interpolation function and the interpolation nodes, a to-be-determined polyline is obtained, and a coefficient is fitted in the interval in an iterative manner. At the same time, the interpolation nodes are iterated with the iteration of the fitting coefficient. A fitting degree coefficient of the to-be-determined polyline and the trigonometric function curve corresponding to the fitting coefficient of each iteration is calculated. A fitting coefficient corresponding to the minimum fitting degree coefficient is determined as the fitting coefficient, and the corresponding interpolation node is determined as the fitting point. The corresponding to-be-determined polyline is determined as a straight line segment, and the to-be-determined interpolation function is a linear function.

Specifically, referring to FIG. 11, in conjunction with Example 1, for a sinusoidal function curve in $$\left[\frac{\pi}{2}, \frac{3\pi}{2}\right],$$

when the preset number of straight line segments is 3, there are two fitting points t1 and t2 and three straight line segments y1, y2, and y3. The coordinates of the two fitting points are $$t1(t_1, v_1) = \left(\left(\frac{1}{2} + Q\right)\pi, -E\right)$$

and $$t2(t_2, v_2) = \left(\left(\frac{3}{2} - Q\right)\pi, E\right),$$

and the relationship between the fitting coefficients E and Q is $$\sin\left(Q \cdot \pi + \frac{\pi}{2}\right) = E.$$

The fitting coefficients E and Q corresponding to the minimum fitting degree coefficient are determined by calculating the fitting degree coefficient $\Sigma(\Delta v)^2$ or $\Sigma|\Delta v|$ of each straight line segment and the curve. In Example 1, E≈0.78801f, Q≈0.21111f.

Further, when the fitting coefficients E and Q corresponding to the sinusoidal function curve are determined, the coordinate values of the fitting points t1 and t2 can be determined based on the fitting coefficients E and Q. The to-be-determined interpolation function is expressed in the form of a linear function (y=kx+b), and the constants of each straight line segment are expressed as follows:

$$\text{First fitting polyline: } y_1 \begin{cases} k_1 = \dfrac{\Delta v(1-E)}{\Delta t(1-2Q)} \\ b_1 = v_1 - \dfrac{\Delta v(1-E)}{\Delta t(1-2Q)} t_1 \end{cases};$$

$$\text{Second fitting polyline: } y_2 \begin{cases} k_2 = \dfrac{\Delta v \cdot E}{2\Delta t \cdot Q} \\ b_2 = \bar{v} - \dfrac{\Delta v \cdot E}{2\Delta t \cdot Q} \bar{t} \end{cases};$$

$$\text{Third fitting polyline: } y_3 \begin{cases} k_3 = \dfrac{\Delta v(1-E)}{\Delta t(1-2Q)} \\ b_3 = v_2 - \dfrac{\Delta v(1-E)}{\Delta t(1-2Q)} t_2 \end{cases};$$

where $\bar{v} = \dfrac{v_1 + v_2}{2}$, $\bar{t} = \dfrac{t_1 + t_2}{2}$, $\Delta v = v_2 - v_1$, $\Delta t = t_2 - t_1$.

In an embodiment, the least square method can also be used to fit the speed variation curve, and the algorithm process of the least square method can refer to the related art, which will not be described in detail herein.

Figure 4:
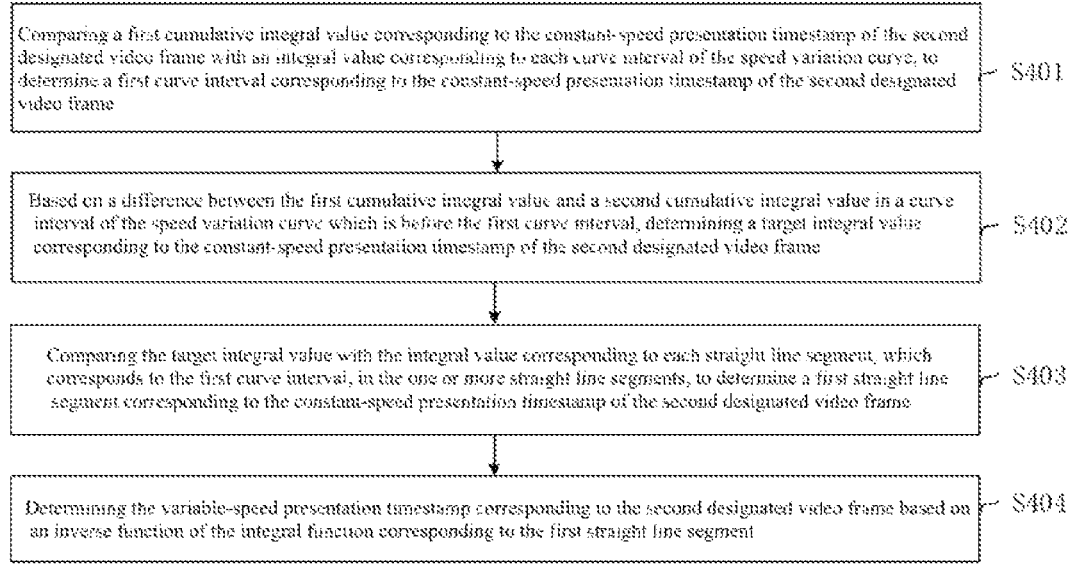
FIG. 4 is a flowchart of a fourth video variable-speed playback method provided by an embodiment of the present disclosure.

Referring to FIG. 4, in an embodiment, the step S106 of based on the constant-speed presentation timestamp of the second designated video frame and the one or more straight line segments, determining a variable-speed presentation timestamp of the second designated video frame includes:

Step S401, comparing a first cumulative integral value corresponding to the constant-speed presentation timestamp of the second designated video frame with an integral value corresponding to each curve interval of the speed variation curve, to determine a first curve interval corresponding to the constant-speed presentation timestamp of the second designated video frame, where the first cumulative integral value corresponds to an integral value between the first video frame in the video and the second designated video frame, and the curve interval is a curve interval on the speed variation curve which corresponds to the variable-speed presentation timestamps of two adjacent video frames in the first designated video frames;

Step S402, based on a difference between the first cumulative integral value and a second cumulative integral value in a curve interval of the speed variation curve which is before the first curve interval, determining a target integral value corresponding to the constant-speed presentation timestamp of the second designated video frame, where the second cumulative integral value corresponds to an integral value between the first video frame in the video and one video frame before the first curve interval, the target integral value corresponds to an integral value between the first video frame and the second designated video frame in the first curve interval;

Step S403, comparing the target integral value with the integral value corresponding to each straight line segment in the one or more straight line segments which corresponds to the first curve interval, to determine a first straight line segment corresponding to the constant-speed presentation timestamp of the second designated video frame; and Step S404, determining the variable-speed presentation timestamp corresponding to the second designated video frame based on an inverse function of the integral function corresponding to the first straight line segment.

In step S401, the cumulative integral value corresponding to the constant-speed presentation timestamp of the second designated video frame includes an amount of video material from the first video frame of the video to the second designated video frame. When the first cumulative integral value is compared with the integral value corresponding to each curve interval in the speed variation curve, the comparison is performed in sequence based on the order of each curve interval in the speed variation curve. For example, the integral value of the first curve interval is compared with the first cumulative integral value, and if the first cumulative integral value is smaller than the integral value of the first curve interval, it is determined that the constant-speed presentation timestamp of the second designated video frame corresponds to the first curve interval, if the first cumulative integral value is larger than the integral value of the first curve interval, the first cumulative integral value is compared with the sum of the integral values of the first and second curve intervals, and so on, until a first curve interval corresponding to the constant-speed presentation timestamp of the second designated video frame is determined.

In step S402, the target integral value is the integral value of the constant-speed presentation timestamp of the second designated video frame in the first curve interval, such as the amount of video material between the first video frame and the second designated video frame in the first curve interval.

In step S403, the corresponding integral values of respective straight line segments in the first curve interval is as follows: assuming that the first curve interval includes three straight line segments, the integral value corresponding to the first straight line segment is the integral value of the interval where the fitting points constituting the first straight line segment are located, the integral value corresponding to the second straight line segment is the integral value of the interval from the first fitting point of the first curve interval to the fitting point at the end of the second straight line segment, and the integral value corresponding to the third straight line segment is the integral value of the interval from the first fitting point of the first curve interval to the fitting point at the end of the third straight line segment.

In step S404, when the first straight line segment corresponding to the constant-speed presentation timestamp of the second designated video frame is determined, the corresponding variable-speed presentation timestamp is determined based on the inverse function of the integral function corresponding to the first straight line segment. Because the first straight line segment is a linear function and its integral function is a quadratic function, the variable-speed presentation timestamp of the second designated video frame can be determined by inversion.

Figure 5:
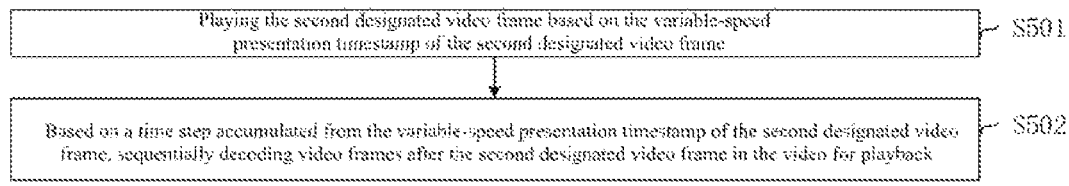
FIG. 5 is a flowchart of a fifth video variable-speed playback method provided by an embodiment of the present disclosure.

Referring to FIG. 5, in an embodiment, the step S106 of starting from the variable-speed presentation timestamp, playing the video at a variable-speed includes:

Step S501, playing the second designated video frame based on the variable-speed presentation timestamp of the second designated video frame; and Step S502, based on a time step accumulated from the variable-speed presentation timestamp of the second designated video frame, sequentially decoding video frames after the second designated video frame in the video for playback.

In step S501, when the variable-speed presentation timestamp of the second designated video frame is determined, the video can be played starting from the second designated video frame based on the variable-speed presentation timestamp.

Since playing video requires decoding subsequent video frames sequentially for playback, in step S502, based on a time step accumulated from the variable-speed presentation timestamp of the second designated video frame, video frames after the second designated video frame in the video are sequentially decoded for playback. The time step refers to a difference between two adjacent variable-speed playback timestamps.

Figure 6:
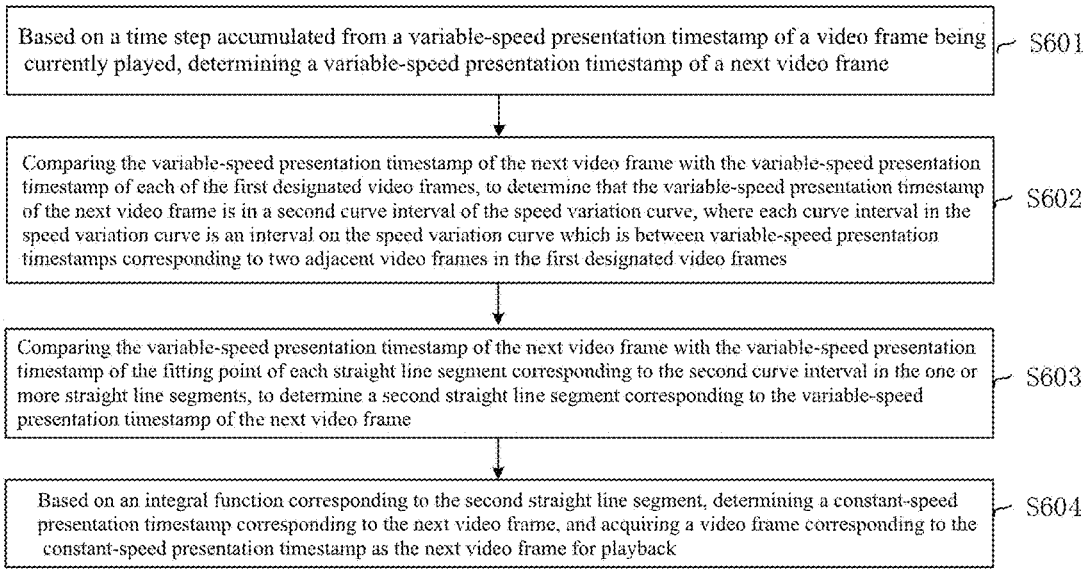
FIG. 6 is a flowchart of a sixth video variable-speed playback method provided by an embodiment of the present disclosure.

Referring to FIG. 6, in an embodiment, the step S502 of sequentially decoding video frames after the second designated video frame in the video for playback based on a time step accumulated from the variable-speed presentation timestamp of the second designated video frame includes:

Step S601, based on a time step accumulated from a variable-speed presentation timestamp of a video frame being currently played, determining a variable-speed presentation timestamp of a next video frame, where the currently played video frame is the second designated video frame or a video frame after the second designated video frame in the video;

Step S602, comparing the variable-speed presentation timestamp of the next video frame with the variable-speed presentation timestamp of each of the first designated video frames, to determine that the variable-speed presentation timestamp of the next video frame is in a second curve interval of the speed variation curve, where each curve interval in the speed variation curve is an interval on the speed variation curve which is between variable-speed presentation timestamps corresponding to two adjacent video frames in the first designated video frames;

Step S603, comparing the variable-speed presentation timestamp of the next video frame with the variable-speed presentation timestamp of the fitting point of each straight line segment corresponding to the second curve interval in the one or more straight line segments, to determine a second straight line segment corresponding to the variable-speed presentation timestamp of the next video frame; and Step S604, based on an integral function corresponding to the second straight line segment, determining a constant-speed presentation timestamp corresponding to the next video frame, and acquiring a video frame corresponding to the constant-speed presentation timestamp as the next video frame for playback.

Figure 12:
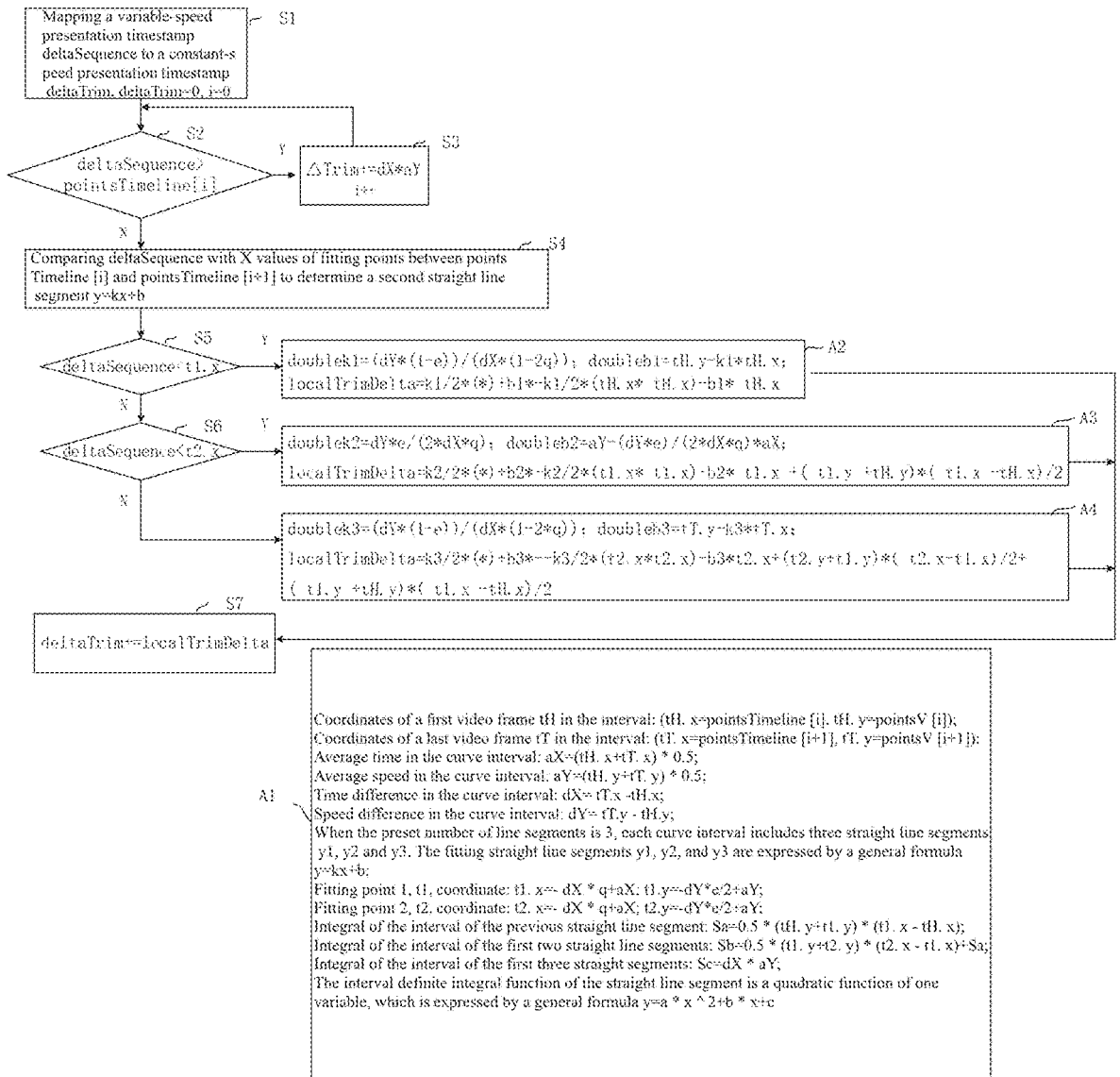
FIG. 12 is a flowchart of establishing a mapping relationship between a variable-speed presentation timestamp and a constant-speed presentation timestamp in a video variable-speed playback method provided by an embodiment of the present disclosure.
Figure 13:
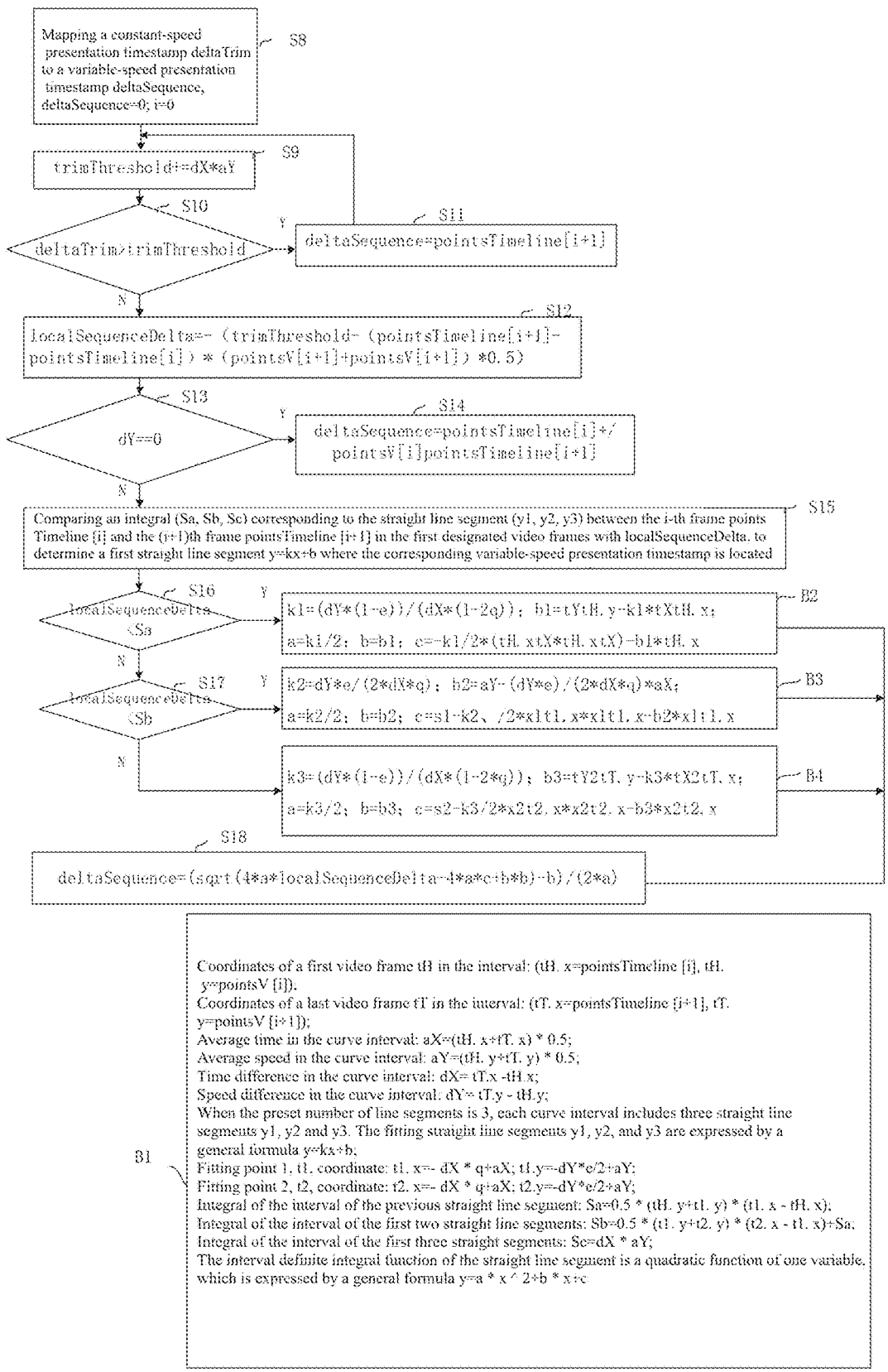
FIG. 13 is a flowchart of establishing a mapping relationship between a constant-speed presentation timestamp and a variable-speed presentation timestamp in a video variable-speed playback method provided by an embodiment of the present disclosure.

Specifically, in the embodiments of the present disclosure, through the above-mentioned steps S401 to S604, a mapping relationship between the constant-speed presentation timestamp and the variable-speed presentation timestamp of the video is established. Referring to FIG. 12 and FIG. 13, in conjunction with Example 1, the steps include the following.

Establishing a mapping relationship between the constant-speed presentation timestamp and the variable-speed presentation timestamp of the video specifically is establishing a mapping model. Referring to FIG. 12 and FIG. 13, step A1 and step B1 corresponds to initialization states of the mapping model, as follows:

At initialization, a curve interval [i~i+1] is recorded:
coordinates of a first video frame tH in the interval is (tH·x=pointsTimeline [i], tH·y=points V [i]);
coordinates of a last video frame tT in the interval is (tT·x=pointsTimeline
[i+1], tT·y=pointsV [i+1]);
average time in the curve interval: aX=(tH·x+tT·x)*0.5;
average speed in the curve interval: aY=(tH·y+tT·y)*0.5;
time difference in the curve interval: dX=tT·x−tH·x;
speed difference in the curve interval: dY=tT·y−tH·y.

When the preset number of line segments is 3, each curve interval includes three straight line segments y1, y2 and y3. The fitting straight line segments y1, y2, and y3 are expressed by a general formula y=kx+b;
Fitting point 1, t1, coordinate: t1·x=−dX*q+aX; t1·y=−dY*e/2+aY;
Fitting point 2, t2, coordinate: t2·x=−dX*q+aX; t2·y=−dY*e/2+aY;
Integral of the interval of the previous straight line segment: Sa−0.5*(tH·y+t1·y)*(t1·x−tH·x);
Integral of the interval of the first two straight line segments: Sb=0.5*(t1·y+t2·y)*(t2·x−t1·x)+Sa;
Integral of the interval of the first three straight segments: Sc=dX*aY.

The interval definite integral function of the straight line segment is a quadratic function of one variable, which is expressed by a general formula y=a*x^2+b*x+c.

In FIG. 12, mapping the variable-speed presentation timestamp to the constant-speed presentation timestamp, that is, calculating corresponding ΔTrim from ΔSequence includes the following steps.

In step S1, a variable-speed presentation timestamp ΔSequence is mapped to a constant-speed presentation timestamp ΔTrim, ΔTrim=0; a loop argument i=0 at initialization, used to traverse the curve interval. The variable-speed presentation timestamp corresponds to the cumulative amount of material from the first frame to the current frame of the video frame sequence.

In step S2, it is determined whether the variable-speed presentation timestamp ΔSequence is larger than the variable-speed presentation timestamp points Timeline [i] of the i-th frame in the first designated video frames; if yes, it proceeds to S3; if no, it means that the variable-speed presentation timestamp is within the curve interval of i~(i+1), that is, determining a second curve interval corresponding to the variable-speed presentation timestamp, and it proceeds to step S4.

In step S3, the target constant-speed presentation timestamp (that is, the to-be-mapped constant-speed presentation timestamp) accumulates the amount of material corresponding to the previous curve interval, ΔTrim+=dX*aY, it proceeds to the next curve interval, and i automatically increases, i++, it returns to step S2.

In step S4, the variable-speed presentation timestamp is compared with the fitting points t1 and t2 of the straight line segment (y1, y2, y3) between the i-th frame pointsTimeline [i] and the (i+1)th frame pointsTimeline [i+1] in the first designated video frames, to determine a second straight line segment where the corresponding variable-speed presentation timestamp is located (comparing the variable-speed presentation timestamp with the variable-speed presentation timestamps of the fitting points in the second curve interval to determine the second straight line segment where the variable-speed presentation timestamp is located).

In step S5, it is determined whether the variable-speed presentation timestamp is smaller than the variable-speed presentation timestamp of the fitting point t1 (the variable-speed presentation timestamp of the fitting point). If yes, it means that the variable-speed presentation timestamp is in the interval of the straight line segment y1, and it proceeds to step A2 to determine a coefficients k1 and b1 of the straight line segment y1. If not, it proceeds to Step S6.

In step S6, it is determined whether the variable-speed presentation timestamp is smaller than the variable-speed presentation timestamp of the fitting point t2 (variable-speed presentation timestamp of the fitting point). If yes, it means that the variable-speed presentation timestamp is in the interval of the straight line segment y2, and it proceeds to step A3 to determine a coefficients k2 and b2 of the straight line segment y2. If not, it means that the variable-speed presentation timestamp is in the interval of the straight line segment y3, and it proceeds to step A4 to determine a coefficients k3 and b3 of the straight line segment y3.

Where step S5 and step S6 are calculating the integral function based on the second straight line segment.

In step A2, double k1=(dY*(1−e))/(dX*(1−2q));
double b1=tH·y−k1*tH·x;
localTrimDelta=k1/2*(ΔSequence*ΔSequence)+b1*ΔSequence−k1/2*(tH·x*tH·x)−b1*tH·x; it proceeds to step S7.
In step A3, double k2=dY*e/(2*dX*q);
double b2=a Y−(dY*e)/(2*dX*q)*aX;
local TrimDelta=k2/2*(ΔSequence*ΔSequence)+b2*ΔSequence−k2/2*(t1·x*t1·x)−b2*t1·x+(t1·y+tH·y)*(t1·x−tH·x)/2; it proceeds to step S7.
In step A4, double k3=(dY*(1−e))/(dX*(1−2*q));
double b3=tT·y−k3*tT·x;
local TrimDelta=k3/2*(ΔSequence*ΔSequence)+13*−ΔSequence−k3/2*(t2·x*t2·x)−b3*t2·x+(t2·y+t1·y)*(t2·x−t1·x)/2+(t1·y+tH·y)*(t1·x−tH·x)/2; it proceeds to step S7.
In step S7, a value is assigned to the constant-speed presentation timestamp ΔTrim ΔTrim+=localTrimDelta, the constant-speed presentation timestamp corresponding to the variable-speed presentation timestamp is determined, and it ends.

Where double is a data type. Specifically, the number of bits is 64, the significant digits are 15-16, and the value range is −1.7E~308~1.7E+308.

In FIG. 13, mapping the constant-speed presentation timestamp to the variable-speed presentation timestamp, that is, calculating corresponding ΔSequence from ΔTrim includes the following steps.

In step S8, a constant-speed presentation timestamp ΔTrim is mapped to a variable-speed presentation timestamp ΔSequence ΔSequence=0; a loop argument i=0 at, initialization, used to traverse the curve interval; the accumulated material amount in the curve interval trimThreshold=0. The first cumulative integral value of the constant-speed presentation timestamp corresponds to the accumulated material amount from the first frame to the current frame in the video frame sequence.

In step S9, trim Threshold+=dX*aY.

In step S10, it is determined whether the constant-speed presentation timestamp ΔTrim is larger than or equal to trimThreshold. If yes, it proceeds to step S11, if not, it means that the constant-speed presentation timestamp is within the curve interval of i~(i+1), that is, the corresponding variable-speed presentation timestamp is also within the curve interval of i~(i+1) (determining the first curve interval corresponding to the constant-speed presentation timestamp), and then it proceeds to step S12.

In step S11, ΔSequence=pointsTimeline [i+1]; the variable-speed presentation timestamp is assigned a value of the variable-speed presentation timestamp of the first video frame in the next curve interval, step into the next curve interval, i automatically increases i++, and it returns to step S9.

In step S12, local SequenceDelta=ΔTrim−(trim Threshold−(pointsTimeline [i+1]-pointsTimeline [i])*(pointsV [i+1]+pointsV [i+1])*0.5). The mapping variable is determined based on the constant-speed presentation timestamp (the target integral value is determined based on the first cumulative integral value and the second cumulative integral value).

In step S13, it is determined whether the speed difference dY in the curve interval is equal to 0 (dY==0). If yes, it means that the curve interval changes speed at a constant speed. It proceeds to step S14, if not, it proceeds to step S15.

In step S14, ΔSequence=points Timeline [i]+localSequenceDelta/points V [i]; a value is assigned to the variable-speed presentation timestamp, the variable-speed presentation timestamp corresponding to the constant-speed presentation timestamp is determined, and it ends.

In step S15, an integral (Sa, Sb, Sc) of an interval of the straight line segment (y1, y2, y3) between the i-th frame pointsTimeline [i] and the (i+1)th frame pointsTimeline [i+1] in the first designated video frames is compared with localSequenceDelta, to determine the straight line segment interval where the corresponding variable-speed presentation timestamp is located (the mapping variable is compared with the corresponding integral value of each straight line segment in the first curve interval to determine the first straight line segment where the constant-speed presentation timestamp is located); it proceeds to step S16.

In step S16, it is determined whether localSequenceDeta is smaller than or equal to Sa. If yes, the corresponding variable-speed presentation timestamp is in the interval of the straight line segment y1, it proceeds to step B2, and the coefficients k1, b1 of the straight line segment y1 and the coefficients a, b, and c of its definite integral function are determined. If not, it proceeds to step S17.

In step S17, it is determined whether localSequenceDeta is smaller than or equal to Sb. If yes, the corresponding variable-speed presentation timestamp is in the interval of the straight line segment y2, it proceeds to step B3, and the coefficients k2, b2 of the straight line segment y2 and the coefficients a, b, and c of its definite integral function are determined. If not, the corresponding variable-speed presentation timestamp is in the interval of the straight line segment y3, it proceeds to step B4, and the coefficients k3, b3 of the straight line segment y3 and the coefficients a, b, and c of its definite integral function are determined.

In steps S16 and S17 are to calculate the inverse function of the integral function based on the first straight line segment.

In step B2, k1=(dY*(1−e))/(dX*(1−2q));
b1=tH·y−k1*tH·x;
a=k1/2; b=b1;
C=−k1/2*(tH·x*tH·x)−b1*tH·x; it proceeds to step S18.
In step B3, k2=dY*e/(2*dX*q);
b2=aY—(dY*e)/(2*dX*q)*aX;
a=k2/2;
b=b2;
c=s1−k2/2*t1·x*t1·x−b2*t1·x; it proceeds to step S18.
In step B4, k3=(dY*(1−e))/(dX*(1−2*q));
b3=tT·y−k3*tT·x;
a=k3/2;
b=b3;
c=s2−k3/2*t2·x*t2·x-b3*t2·x; it proceeds to step S18.
In step S18, ΔSequence=(sqrt (4*a*localSequenceDelta−4*a*c+b*b)−b)/(2*a) where sqrt denotes a squired root; the variable-speed presentation timestamp corresponding to the constant-speed presentation timestamp is determined. It ends.

The above provided mapping model includes a module that maps a constant-speed presentation timestamp to a variable-speed presentation timestamp executed by step S601-S604, and a module that maps a variable-speed presentation timestamp to a constant-speed presentation timestamp executed by step S401-S404.

In an application example, when the user wants to perform curve variable-speed editing on a video segment, the user can input the video into the application program. When entering the display interface of variable-speed curve editing, several preset anchor points will be displayed (each anchor point corresponds to one video frame). The user can adjust the playback speed of the corresponding video frame by dragging the preset anchor point, or adjust the playback speed of other video frames by adding or deleting anchor points.

Whenever the user adjusts the playback speed of a video frame corresponding to an anchor point, a curve variable-speed instruction will be initiated. In response to the curve variable-speed instruction, the relevant data of each first designated video frame in the video will be acquired for processing, and the preview process will begin. In the preview process, as shown in FIG. 8, the user can drag the playback progress bar to select any video frame (the second designated video frame), and play the video from this video frame.

Figure 14:
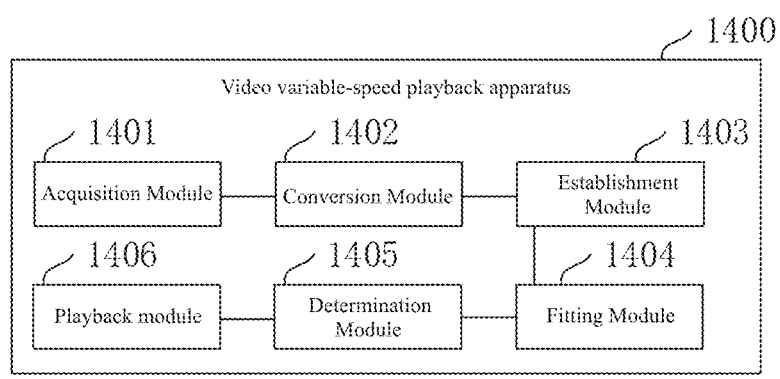
FIG. 14 is a schematic structural diagram of a video variable-speed playback apparatus provided by an embodiment of the present disclosure.

Referring to FIG. 14, FIG. 14 is a schematic structural diagram of a video variable-speed playback apparatus provided by an embodiment of the present disclosure. The video variable-speed playback apparatus 1400 can include:
an acquisition module 1401 configured to, in response to a curve variable-speed instruction, acquire constant-speed presentation timestamps and variable-speed playback speeds of respective first designated video frames in a video;
a conversion module 1402 configured to convert the constant-speed presentation timestamps of the first designated video frames into variable-speed presentation timestamps;
an establishment module 1403 configured to establish a speed variation curve based on an association relationship between the variable-speed presentation timestamps and the variable-speed playback speeds of the first designated video frames;
a fitting module 1404 configured to fit the speed variation curve into one or more straight line segments;
a determination module 1405 configured to, based on a second designated video frame indicated by a variable-speed playback instruction, determine a constant-speed presentation timestamp of the second designated video frame; and
a playback module 1406 configured to, based on the constant-speed presentation timestamp of the second designated video frame and the one or more straight line segments, determine a variable-speed presentation timestamp of the second designated video frame, and starting from the variable-speed presentation timestamp, play the video at a variable-speed.

The variable-speed presentation timestamp of the second designated video frame is determined by an inverse function of an integral function of a first straight line segment, and the first straight line segment is a straight line segment, where the variable-speed presentation timestamp of the second designated video frame is located, of the one or more straight line segments.

In an embodiment, the conversion module 1402 includes:
a conversion unit configured to by utilizing a central symmetry property of a trigonometric function, convert the constant-speed presentation timestamps of the first designated video frames to the variable-speed presentation timestamps.

In an embodiment, the speed variation curve between two adjacent video frames in the first designated video frames is a segment of trigonometric function curve established based on the association relationship between the variable-speed presentation timestamps and the variable-speed playback speeds of the two adjacent video frames.

In an embodiment, a derivative of the speed variation curve at a position representing the first designated video frame is zero.

In an embodiment, the fitting module includes:
a first fitting unit configured to set fitting points on the speed variation curve using a piecewise linear interpolation algorithm or a least square method;
a second fitting unit configured to fit the speed variation curve into one or more straight segments based on the fitting points, where one segment of the straight segment is determined by two adjacent fitting points.

In an embodiment, the playback module 1406 includes:
a first determination unit configured to compare a first cumulative integral value corresponding to the constant-speed presentation timestamp of the second designated video frame with an integral value corresponding to each curve interval of the speed variation curve, to determine a first curve interval corresponding to the constant-speed presentation timestamp of the second designated video frame, where the first cumulative integral value corresponds to an integral value between the first video frame in the video and the second designated video frame, and the curve interval is a curve interval on the speed variation curve which corresponds to the variable-speed presentation timestamps of two adjacent video frames in the first designated video frames;
a second determination unit configured to, based on a difference between the first cumulative integral value and a second cumulative integral value in a curve interval of the speed variation curve which is before the first curve interval, determine a target integral value corresponding to the constant-speed presentation timestamp of the second designated video frame, where the second cumulative integral value corresponds to an integral value between the first video frame in the video and one video frame before the first curve interval, the target integral value corresponds to an integral value between the first video frame and the second designated video frame in the first curve interval;
a third determination unit configured to compare the target integral value with the integral value corresponding to each straight line segment in the one or more straight line segments which corresponds to the first curve interval, to determine a first straight line segment corresponding to the constant-speed presentation timestamp of the second designated video frame;
a fourth determination unit configured to determine the variable-speed presentation timestamp corresponding to the second designated video frame based on an inverse function of the integral function corresponding to the first straight line segment.

In an embodiment, the playback module 1406 includes:
a first playback unit configured to play the second designated video frame based on the variable-speed presentation timestamp of the second designated video frame;
a second playback unit configured to, based on a time step accumulated from the variable-speed presentation timestamp of the second designated video frame, sequentially decode video frames after the second designated video frame in the video for playback.

In an embodiment, the second playback unit includes:
a fifth determination unit configured to, based on a time step accumulated from a variable-speed presentation timestamp of a video frame being currently played, determine a variable-speed presentation timestamp of a next video frame, where the currently played video frame is the second designated video frame or a video frame after the second designated video frame in the video;
a sixth determination unit configured to compare the variable-speed presentation timestamp of the next video frame with the variable-speed presentation timestamp of each of the first designated video frames, to determine that the variable-speed presentation timestamp of the next video frame is in a second curve interval of the speed variation curve, where each curve interval in the speed variation curve is an interval on the speed variation curve which is between variable-speed presentation timestamps corresponding to two adjacent video frames in the first designated video frames;
a seventh determination unit configured to compare the variable-speed presentation timestamp of the next video frame with the variable-speed presentation timestamp of the fitting point of each straight line segment corresponding to the second curve interval in the one or more straight line segments, to determine a second straight line segment corresponding to the variable-speed presentation timestamp of the next video frame; and an eighth determination unit configured to determine the constant-speed presentation timestamp corresponding to the next video frame based on the integral function corresponding to the second straight line segment, and acquire a video frame corresponding to the constant-speed presentation timestamp as the next video frame for playback.

The video variable-speed playback apparatus in the embodiments of the present disclosure can perform a video variable-speed playback method provided in the embodiments of the present disclosure, and its implementation principles are similar. The actions performed by each module in the video variable-speed playback apparatus in the embodiments of the present disclosure correspond to the steps in the video variable-speed playback method in the embodiments of the present disclosure. For the detailed functional description of each module of the video variable-speed playback apparatus, reference can be made to the description in the corresponding video variable-speed playback method shown in the above, which will not be repeated here.

Figure 15:
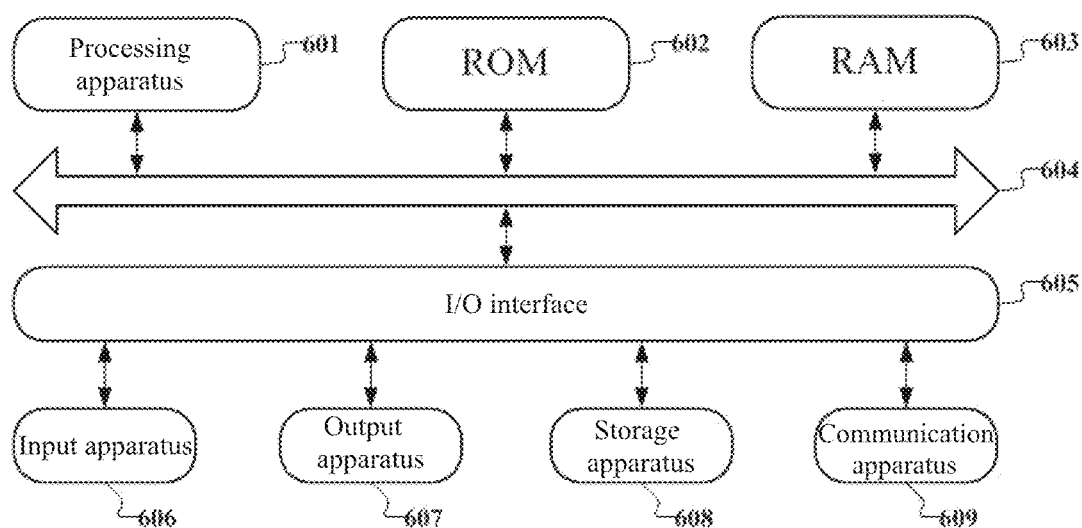
FIG. 15 is a schematic structural diagram of an electronic device provided by an embodiment of the present disclosure.

Referring to FIG. 15 below, a structural diagram of an electronic device (such as a mobile terminal) 600 suitable for implementing the embodiments of the present disclosure is shown. The mobile terminal in the embodiments of the present disclosure can include, but is not limited to, a device such as a computer. The electronic device shown in FIG. 15 is only an example, and there should be no restrictions on the function and scope of application of the embodiments of the present disclosure.

The electronic device includes a memory and a processor, wherein the processor here can be referred to as a processing apparatus 601 below, and the memory can include at least one of a read-only memory (ROM) 602, a random access memory (RAM) 603, and a storage apparatus 608 below, as shown below.

As shown in FIG. 15, the electronic device 600 can include a processing apparatus (such as a central processor, a graphics processor, etc.) 601, which can perform various appropriate actions and processes according to a program stored in a read-only memory (ROM) 602 or a program loaded into a random access memory (RAM) 603 from the storage apparatus 608. In RAM 603, various programs and data required for the operation of electronic device 600 are also stored. The processing apparatus 601, ROM 602, and RAM 603 are connected to each other via a bus 604. An input/output (I/O) interface 605 is also connected to the bus 604.

Generally, the following apparatuses can be connected to the I/O interface 605: an input apparatus 606 including, for example, a touch screen, a touch pad, a keyboard, a mouse, a camera, a microphone, an accelerometer, a gyroscope, and the like; an output apparatus 607 including, for example, a liquid crystal display (LCD), a loudspeaker, a vibrator, and the like; a storage apparatus 608 including, for example, a tape, a hard disk, and the like; and a communication apparatus 609. The communication apparatus 609 can allow the electronic device 600 to communicate wirelessly or wirelessly with other devices to exchange data. Although FIG. 15 shows an electronic device 600 with various apparatuses, it should be understood that it is not required to implement or have all the devices shown. More or fewer devices can alternatively be implemented or provided.

In particular, according to the embodiments of the present disclosure, the process described above with reference to the flowchart can be implemented as a computer software program. For example, an embodiment of the present disclosure includes a computer program product, which includes a computer program loaded on a non-transient computer-readable medium, and the computer program includes program code for executing the method shown in the flowchart. In such an embodiment, the computer program can be downloaded and installed from the network through the communication apparatus 609, or installed from the storage apparatus 608, or installed from the ROM 602. When the computer program is executed by the processing apparatus 601, the above functions defined in the method of the embodiments of the present disclosure are executed.

It should be noted that the computer-readable medium described in the present disclosure can be a computer-readable signal medium, a computer-readable medium, or any combination of the two. The computer-readable medium can be, for example, but not limited to, an electrical, magnetic, optical, electromagnetic, infrared, or semiconductor system, apparatus, or device, or any combination thereof. More specific examples of the computer-readable medium can include, but is not limited to: an electrical connection based on one or more wires, a portable computer disk, a hard disk, a random access memory (RAM), a read-only memories (ROM), an erasable programmable read-only memory (EPROM or a flash memory), an optical fiber, a portable compact disk read-only memory (CD-ROM), an optical storage device, a magnetic storage device or any suitable combination of the above. In the present disclosure, the computer-readable medium can be any tangible medium containing or storing a program, which can be used by or in combination with an instruction execution system, apparatus, or device. In the present disclosure, the computer-readable signal medium can include data signals transmitted in a baseband or as part of a carrier, in which computer-readable program code is carried. Such transmitted data signals can take various forms, including but not limited to electromagnetic signals, optical signals or any suitable combination of the above. The computer-readable medium can also be any computer-readable medium other than a computer-readable storage medium, which can transmit, propagate, or transmit programs for use by or in combination with an instruction execution system, apparatus, or device. The program code contained on the computer readable medium can be transmitted with any appropriate medium, including but not limited to: wire, optical cable, RF (radio frequency), etc., or any appropriate combination of the above.

In some embodiments, clients and servers can communicate using any currently known or future developed network protocol, such as HTTP (HyperText Transfer Protocol), and can be interconnected with digital data communications in any form or medium, such as communication networks. Examples of communication networks include local area networks ("LANs"), wide area networks ("WANs"), the Internet (for example, the Internet), end-to-end networks (for example, ad hoc end-to-end networks), and any currently known or future developed networks.

The computer-readable medium can be included in the electronic device; or can also exist independently without being assembled into the electronic device.

The computer-readable medium carries one or more programs. When the one or more programs are executed by the electronic device, the electronic device can execute the following steps: in response to a curve variable-speed instruction, acquiring constant-speed presentation timestamps and variable-speed playback speeds of respective first designated video frames in a video; converting the constant-speed presentation timestamps of the first designated video frames into variable-speed presentation timestamps; establishing a speed variation curve based on an association relationship between the variable-speed presentation timestamps and the variable-speed playback speeds of the first designated video frames; fitting the speed variation curve into one or more straight line segments; based on a second designated video frame indicated by a variable-speed playback instruction, determining a constant-speed presentation timestamp of the second designated video frame; and based on the constant-speed presentation timestamp of the second designated video frame and the one or more straight line segments, determining a variable-speed presentation timestamp of the second designated video frame, and starting from the variable-speed presentation timestamp, playing the video at a variable-speed, wherein the variable-speed presentation timestamp of the second designated video frame is determined by an inverse function of an integral function of a first straight line segment, and the first straight line segment is a straight line segment of the one or more straight line segments where the variable-speed presentation timestamp of the second designated video frame is located.

Computer program code for performing the operations of the present disclosure can be written in one or more programming languages or a combination thereof. The programming languages include, but not limited to, object-oriented programming languages such as Java, Smalltalk, C++, and conventional procedural programming languages such as "C" or similar programming languages. The program code can be executed completely on the user computer, partially on the user computer, as an independent software package, partially on the user computer, partially on the remote computer, or completely on the remote computer or a server. In the case involving a remote computer, the remote computer can be connected to the user computer through any kind of network, including a local area network (LAN) or a wide area network (WAN), or it can be connected to an external computer (for example, using an Internet service provider to connect over the Internet).

The flowcharts and block diagrams in the accompanying drawings illustrate the possible architectures, functions, and operations of the systems, the methods, and the computer program products according to various embodiments of the present disclosure. In this regard, each block in the flowchart or the block diagram can represent a module, a program segment, or a part of a code that contains one or more executable instructions for implementing a specified logical function. It should also be noted that in some alternative implementations, the functions marked in the block can also occur in a different order from those marked in the drawings. For example, in practical, two consecutive blocks can be executed basically in parallel, or they can sometimes be executed in a reverse order, depending on the function involved. It should also be noted that each block in the block diagram and/or the flowchart, and the combination of the blocks in the block diagram and/or the flowchart, can be implemented with dedicated hardware based system that performs a specified function or operation, or can be implemented with a combination of dedicated hardware and computer instructions.

The modules or units described in the embodiments of the present disclosure can be realized by software or hardware. Wherein, the names of the modules or units do not constitute the definition of the units itself in some cases, for example, a fitting module can also be described as "a module configured to fit the speed variation curve into one or more straight line segments."

The functions described above herein can be performed at least partially by one or more hardware logical units. For example, without limitation, exemplary types of hardware logic components that can be used include: a field programmable gate array (FPGA), an application specific integrated circuit (ASIC), an application specific standard product (ASSP), a system on chip (SOC), a complex programmable logic device (CPLD), and so on.

In the context of the present disclosure, a machine-readable medium can be a tangible medium, which can contain or store programs for use by or in combination with an instruction execution system, apparatus or device. The machine-readable medium can be a machine-readable signal medium or a machine-readable storage medium. The machine-readable medium can include, but is not limited to, an electronic, magnetic, optical, electromagnetic, infrared, or semiconductor system, apparatus, or device, or any suitable combination thereof. More specific examples of the computer-readable storage medium can include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

According to one or more embodiments of the present disclosure, a video variable-speed playback method is provided, including: in response to a curve variable-speed instruction, acquiring constant-speed presentation timestamps and variable-speed playback speeds of respective first designated video frames in a video; converting the constant-speed presentation timestamps of the first designated video frames into variable-speed presentation timestamps; establishing a speed variation curve based on an association relationship between the variable-speed presentation timestamps and the variable-speed playback speeds of the first designated video frames; fitting the speed variation curve into one or more straight line segments; based on a second designated video frame indicated by a variable-speed playback instruction, determining a constant-speed presentation timestamp of the second designated video frame; and based on the constant-speed presentation timestamp of the second designated video frame and the one or more straight line segments, determining a variable-speed presentation timestamp of the second designated video frame, and starting from the variable-speed presentation timestamp, playing the video at a variable-speed, where the variable-speed presentation timestamp of the second designated video frame is determined by an inverse function of an integral function of a first straight line segment, and the first straight line segment is a straight line segment of the one or more straight line segments where the variable-speed presentation timestamp of the second designated video frame is located.

In an embodiment, converting the constant-speed presentation timestamps of the first designated video frames into variable-speed presentation timestamps includes: by utilizing a central symmetry property of a trigonometric function, converting the constant-speed presentation timestamps of the first designated video frames to the variable-speed presentation timestamps.

In an embodiment, the speed variation curve between two adjacent video frames in the first designated video frames is a segment of trigonometric function curve established based on the association relationship between the variable-speed presentation timestamps and the variable-speed playback speeds of the two adjacent video frames.

In an embodiment, a derivative of the speed variation curve at a position representing the first designated video frame is zero.

In an embodiment, fitting the speed variation curve into one or more straight line segments includes: setting fitting points on the speed variation curve using a piecewise linear interpolation algorithm or a least square method; and fitting the speed variation curve into one or more straight segments based on the fitting points, where one segment of the straight segment is determined by two adjacent fitting points.

In an embodiment, determining a variable-speed presentation timestamp of the second designated video frame based on the constant-speed presentation timestamp of the second designated video frame and the one or more straight line segments includes: comparing a first cumulative integral value corresponding to the constant-speed presentation timestamp of the second designated video frame with an integral value corresponding to each curve interval of the speed variation curve, to determine a first curve interval corresponding to the constant-speed presentation timestamp of the second designated video frame, where the first cumulative integral value corresponds to an integral value between the first video frame in the video and the second designated video frame, and the curve interval is a curve interval on the speed variation curve which corresponds to the variable-speed presentation timestamps of two adjacent video frames in the first designated video frames; based on a difference between the first cumulative integral value and a second cumulative integral value in a curve interval of the speed variation curve which is before the first curve interval, determining a target integral value corresponding to the constant-speed presentation timestamp of the second designated video frame, where the second cumulative integral value corresponds to an integral value between the first video frame in the video and one video frame before the first curve interval, the target integral value corresponds to an integral value between the first video frame and the second designated video frame in the first curve interval; comparing the target integral value with the integral value corresponding to each straight line segment in the one or more straight line segments which corresponds to the first curve interval, to determine a first straight line segment corresponding to the constant-speed presentation timestamp of the second designated video frame; determining the variable-speed presentation timestamp corresponding to the second designated video frame based on an inverse function of the integral function corresponding to the first straight line segment.

In an embodiment, starting from the variable-speed presentation timestamp, playing the video at a variable-speed includes: playing the second designated video frame based on the variable-speed presentation timestamp of the second designated video frame; based on a time step accumulated from the variable-speed presentation timestamp of the second designated video frame, sequentially decoding video frames after the second designated video frame in the video for playback.

In an embodiment, based on a time step accumulated from the variable-speed presentation timestamp of the second designated video frame, sequentially decoding video frames after the second designated video frame in the video for playback includes: based on a time step accumulated from a variable-speed presentation timestamp of a video frame being currently played, determining a variable-speed presentation timestamp of a next video frame, where the currently played video frame is the second designated video frame or a video frame after the second designated video frame in the video; comparing the variable-speed presentation timestamp of the next video frame with the variable-speed presentation timestamp of each of the first designated video frames, to determine that the variable-speed presentation timestamp of the next video frame is in a second curve interval of the speed variation curve, where each curve interval in the speed variation curve is an interval on the speed variation curve which is between variable-speed presentation timestamps corresponding to two adjacent video frames in the first designated video frames; comparing the variable-speed presentation timestamp of the next video frame with the variable-speed presentation timestamp of the fitting point of each straight line segment corresponding to the second curve interval in the one or more straight line segments, to determine a second straight line segment corresponding to the variable-speed presentation timestamp of the next video frame; and determining the constant-speed presentation timestamp corresponding to the next video frame based on the integral function corresponding to the second straight line segment, and acquiring a video frame corresponding to the constant-speed presentation timestamp as the next video frame for playback.

According to one or more embodiments of the present disclosure, a video variable-speed playback apparatus is provided, including: an acquisition module configured to, in response to a curve variable-speed instruction, acquire constant-speed presentation timestamps and variable-speed playback speeds of respective first designated video frames in a video;
- a conversion module configured to convert the constant-speed presentation timestamps of the first designated video frames into variable-speed presentation timestamps;
- an establishment module configured to establish a speed variation curve based on an association relationship between the variable-speed presentation timestamps and the variable-speed playback speeds of the first designated video frames;
- a fitting module configured to fit the speed variation curve into one or more straight line segments;
- a determination module configured to, based on a second designated video frame indicated by a variable-speed playback instruction, determine a constant-speed presentation timestamp of the second designated video frame; and
- a playback module configured to, based on the constant-speed presentation timestamp of the second designated video frame and the one or more straight line segments, determine a variable-speed presentation timestamp of the second designated video frame, and starting from the variable-speed presentation timestamp, play the video at a variable-speed,
- wherein the variable-speed presentation timestamp of the second designated video frame is determined by an inverse function of an integral function of a first straight line segment, and the first straight line segment is a straight line segment of the one or more straight line segments where the variable-speed presentation timestamp of the second designated video frame is located.

In an embodiment, the conversion module includes:
- a conversion unit configured to by utilizing a central symmetry property of a trigonometric function, convert the constant-speed presentation timestamps of the first designated video frames to the variable-speed presentation timestamps.

In an embodiment, the speed variation curve between two adjacent video frames in the first designated video frames is a segment of trigonometric function curve established based on the association relationship between the variable-speed presentation timestamps and the variable-speed playback speeds of the two adjacent video frames.

In an embodiment, a derivative of the speed variation curve at a position representing the first designated video frame is zero.

In an embodiment, the fitting module includes:
a first fitting unit configured to set fitting points on the speed variation curve using a piecewise linear interpolation algorithm or a least square method;
a second fitting unit configured to fit the speed variation curve into one or more straight segments based on the fitting points, where one segment of the straight segment is determined by two adjacent fitting points.

In an embodiment, the playback module includes:
a first determination unit configured to compare a first cumulative integral value corresponding to the constant-speed presentation timestamp of the second designated video frame with an integral value corresponding to each curve interval of the speed variation curve, to determine a first curve interval corresponding to the constant-speed presentation timestamp of the second designated video frame, where the first cumulative integral value corresponds to an integral value between the first video frame in the video and the second designated video frame, and the curve interval is a curve interval on the speed variation curve which corresponds to the variable-speed presentation timestamps of two adjacent video frames in the first designated video frames;
a second determination unit configured to, based on a difference between the first cumulative integral value and a second cumulative integral value in a curve interval before the first curve interval, determine a target integral value corresponding to the constant-speed presentation timestamp of the second designated video frame, where the second cumulative integral value corresponds to an integral value between the first video frame in the video and one video frame before the first curve interval, the target integral value corresponds to an integral value between the first video frame and the second designated video frame in the first curve interval;
a third determination unit configured to compare the target integral value with the integral value corresponding to each straight line segment in the one or more straight line segments which corresponds to the first curve interval, to determine a first straight line segment corresponding to the constant-speed presentation timestamp of the second designated video frame;
a fourth determination unit configured to determine the variable-speed presentation timestamp corresponding to the second designated video frame based on an inverse function of the integral function corresponding to the first straight line segment.

In an embodiment, the playback module includes:
a first playback unit configured to play the second designated video frame based on the variable-speed presentation timestamp of the second designated video frame;

a second playback unit configured to, based on a time step accumulated from the variable-speed presentation timestamp of the second designated video frame, sequentially decode video frames after the second designated video frame in the video for playback.

In an embodiment, the second playback unit includes:
a fifth determination unit configured to, based on a time step accumulated from a variable-speed presentation timestamp of a video frame being currently played, determine a variable-speed presentation timestamp of a next video frame, where the currently played video frame is the second designated video frame or a video frame after the second designated video frame in the video;
a sixth determination unit configured to compare the variable-speed presentation timestamp of the next video frame with the variable-speed presentation timestamps of respective first designated video frames, to determine that the variable-speed presentation timestamp of the next video frame is in a second curve interval of the speed variation curve, where each curve interval in the speed variation curve is an interval on the speed variation curve which is between variable-speed presentation timestamps corresponding to two adjacent video frames in the first designated video frames; a seventh determination unit configured to compare the variable-speed presentation timestamp of the next video frame with the variable-speed presentation timestamp of the fitting point of each straight line segment corresponding to the second curve interval in the one or more straight line segments, to determine a second straight line segment corresponding to the variable-speed presentation timestamp of the next video frame; and
an eighth determination unit configured to determine the constant-speed presentation timestamp corresponding to the next video frame based on the integral function corresponding to the second straight line segment, and acquire a video frame corresponding to the constant-speed presentation timestamp as the next video frame for playback.

The above description only illustrates preferred embodiments of the present disclosure and applied technical principles. Those skilled in the art should understand that the disclosure scope involved in this disclosure is not limited to the technical solutions obtained by the specific combination of the above technical features, but also covers other technical solutions obtained by arbitrary combination of the above technical features or their equivalent features without departing from the above disclosure concept. For example, the above features and the technical features provided in the present disclosure (but not limited to) with similar functions can be replaced each other to form a technical solution.

Furthermore, although the operations have been described in a particular order, this should not be understood as requiring the operations to be performed in the particular order shown or in a sequential order. Under certain circumstances, multitasking and parallel processing can be beneficial. Similarly, although the above discussion contains a number of specific implementation details, these should not be interpreted as limiting the scope of the disclosure. Certain features described in the context of separate embodiments can also be implemented in a single embodiment in combination. On the other hand, various features described in the context of a single embodiment can also be implemented in multiple embodiments individually or in any suitable sub combination.

Although the subject matter has been described in terms specific to the structural features and/or method logic actions, it should be understood that the subject matter defined in the appended claims is not necessarily limited to the specific features or actions described above. On the contrary, the specific features and actions described above are only examples of implementing the claims.

What is claimed is:

1. A video variable-speed playback method, comprising:
in response to a curve variable-speed instruction, acquiring constant-speed presentation timestamps and variable-speed playback speeds of first designated video frames in a video;
converting the constant-speed presentation timestamps of the first designated video frames into variable-speed presentation timestamps;
establishing a speed variation curve based on an association relationship between the variable-speed presentation timestamps and the variable-speed playback speeds of the first designated video frames;
fitting the speed variation curve into one or more straight line segments;
based on a second designated video frame indicated by a variable-speed playback instruction, determining a constant-speed presentation timestamp of the second designated video frame; and
based on the constant-speed presentation timestamp of the second designated video frame and the one or more straight line segments, determining a variable-speed presentation timestamp of the second designated video frame, and starting from the variable-speed presentation timestamp, playing the video at a variable-speed,
wherein the variable-speed presentation timestamp of the second designated video frame is determined by an inverse function of an integral function of a first straight line segment, and the first straight line segment is a straight line segment, where the variable-speed presentation timestamp of the second designated video frame is located, of the one or more straight line segments.

2. The method of claim 1, wherein converting the constant-speed presentation timestamps of the first designated video frames into the variable-speed presentation timestamps comprises:
by utilizing a central symmetry property of a trigonometric function, converting the constant-speed presentation timestamps of the first designated video frames to the variable-speed presentation timestamps.

3. The method of claim 1, wherein the speed variation curve between two adjacent video frames in the first designated video frames is a segment of trigonometric function curve established based on the association relationship between the variable-speed presentation timestamps and the variable-speed playback speeds of the two adjacent video frames.

4. The method of claim 1, wherein a derivative of the speed variation curve at a position representing the first designated video frame is zero.

5. The method of claim 1, wherein fitting the speed variation curve into the one or more straight line segments comprises:
setting fitting points on the speed variation curve using a piecewise linear interpolation algorithm or a least square method; and
fitting the speed variation curve into one or more straight segments based on the fitting points, wherein one segment of the straight segment is determined by two adjacent fitting points.

6. The method of claim 1, wherein determining a variable-speed presentation timestamp of the second designated video frame based on the constant-speed presentation timestamp of the second designated video frame and the one or more straight line segments comprises:
comparing a first cumulative integral value corresponding to the constant-speed presentation timestamp of the second designated video frame with an integral value corresponding to each curve interval of the speed variation curve, to determine a first curve interval corresponding to the constant-speed presentation timestamp of the second designated video frame, wherein the first cumulative integral value corresponds to an integral value between the first video frame in the video and the second designated video frame, and the curve interval is a curve interval on the speed variation curve which corresponds to the variable-speed presentation timestamps of two adjacent video frames in the first designated video frames;
based on a difference between the first cumulative integral value and a second cumulative integral value in a curve interval of the speed variation curve which is before the first curve interval, determining a target integral value corresponding to the constant-speed presentation timestamp of the second designated video frame, wherein the second cumulative integral value corresponds to an integral value between the first video frame in the video and one video frame before the first curve interval, the target integral value corresponds to an integral value between the first video frame and the second designated video frame in the first curve interval;
comparing the target integral value with the integral value corresponding to each straight line segment, which corresponds to the first curve interval, in the one or more straight line segments, to determine a first straight line segment corresponding to the constant-speed presentation timestamp of the second designated video frame; and
determining the variable-speed presentation timestamp corresponding to the second designated video frame based on an inverse function of the integral function corresponding to the first straight line segment.

7. The method of claim 1, wherein starting from the variable-speed presentation timestamp, playing the video at a variable-speed comprises:
playing the second designated video frame based on the variable-speed presentation timestamp of the second designated video frame; and
based on a time step accumulated from the variable-speed presentation timestamp of the second designated video frame, sequentially decoding video frames after the second designated video frame in the video for playback.

8. The method of claim 7, wherein based on a time step accumulated from the variable-speed presentation timestamp of the second designated video frame, sequentially decoding video frames after the second designated video frame in the video for playback comprises:
based on a time step accumulated from a variable-speed presentation timestamp of a video frame being currently played, determining a variable-speed presentation timestamp of a next video frame, wherein the currently played video frame is the second designated video frame or a video frame after the second designated video frame in the video;

comparing the variable-speed presentation timestamp of the next video frame with the variable-speed presentation timestamps of the first designated video frames, to determine that the variable-speed presentation timestamp of the next video frame is in a second curve interval of the speed variation curve, wherein a curve interval in the speed variation curve is an interval on the speed variation curve which is between variable-speed presentation timestamps corresponding to two adjacent video frames in the first designated video frames;

comparing the variable-speed presentation timestamp of the next video frame with the variable-speed presentation timestamp of the fitting point of each straight line segment corresponding to the second curve interval in the one or more straight line segments, to determine a second straight line segment corresponding to the variable-speed presentation timestamp of the next video frame; and determining the constant-speed presentation timestamp corresponding to the next video frame based on the integral function corresponding to the second straight line segment, and acquiring a video frame corresponding to the constant-speed presentation timestamp as the next video frame for playback.

9. A video variable-speed playback apparatus, comprising:
an acquisition module, configured to, in response to a curve variable-speed instruction, acquire constant-speed presentation timestamps and variable-speed playback speeds of respective first designated video frames in a video;
a conversion module, configured to convert the constant-speed presentation timestamps of the first designated video frames into variable-speed presentation timestamps;
an establishment module, configured to establish a speed variation curve based on an association relationship between the variable-speed presentation timestamps and the variable-speed playback speeds of the first designated video frames;
a fitting module, configured to fit the speed variation curve into one or more straight line segments;
a determination module, configured to, based on a second designated video frame indicated by a variable-speed playback instruction, determine a constant-speed presentation timestamp of the second designated video frame; and
a playback module configured to, based on the constant-speed presentation timestamp of the second designated video frame and the one or more straight line segments, determine a variable-speed presentation timestamp of the second designated video frame, and starting from the variable-speed presentation timestamp, play the video at a variable-speed,
wherein the variable-speed presentation timestamp of the second designated video frame is determined by an inverse function of an integral function of a first straight line segment, and the first straight line segment is a straight line segment, where the variable-speed presentation timestamp of the second designated video frame is located, of the one or more straight line segments.

10. An electronic device, comprising:
a memory and a processor;
wherein a computer program is stored in the memory;
the processor is configured to execute the method of claim 1 when running the computer program.

11. A non-transitory computer-readable medium, on which a computer program is stored, wherein the method of claim 1 is implemented in a case where the computer program is executed by a processor.

12. The method of claim 2, wherein the speed variation curve between two adjacent video frames in the first designated video frames is a segment of trigonometric function curve established based on the association relationship between the variable-speed presentation timestamps and the variable-speed playback speeds of the two adjacent video frames.

13. The method of claim 12, wherein a derivative of the speed variation curve at a position representing the first designated video frame is zero.

14. The method of claim 13, wherein fitting the speed variation curve into the one or more straight line segments comprises:
setting fitting points on the speed variation curve using a piecewise linear interpolation algorithm or a least square method; and
fitting the speed variation curve into one or more straight segments based on the fitting points,
wherein one segment of the straight segment is determined by two adjacent fitting points.

15. The method of claim 14, wherein determining a variable-speed presentation timestamp of the second designated video frame based on the constant-speed presentation timestamp of the second designated video frame and the one or more straight line segments comprises:
comparing a first cumulative integral value corresponding to the constant-speed presentation timestamp of the second designated video frame with an integral value corresponding to each curve interval of the speed variation curve, to determine a first curve interval corresponding to the constant-speed presentation timestamp of the second designated video frame, wherein the first cumulative integral value corresponds to an integral value between the first video frame in the video and the second designated video frame, and the curve interval is a curve interval on the speed variation curve which corresponds to the variable-speed presentation timestamps of two adjacent video frames in the first designated video frames;
based on a difference between the first cumulative integral value and a second cumulative integral value in a curve interval of the speed variation curve which is before the first curve interval, determining a target integral value corresponding to the constant-speed presentation timestamp of the second designated video frame, wherein the second cumulative integral value corresponds to an integral value between the first video frame in the video and one video frame before the first curve interval, the target integral value corresponds to an integral value between the first video frame and the second designated video frame in the first curve interval;
comparing the target integral value with the integral value corresponding to each straight line segment, which corresponds to the first curve interval, in the one or more straight line segments, to determine a first straight line segment corresponding to the constant-speed presentation timestamp of the second designated video frame; and
determining the variable-speed presentation timestamp corresponding to the second designated video frame based on an inverse function of the integral function corresponding to the first straight line segment.

16. The method of claim 15, wherein starting from the variable-speed presentation timestamp, playing the video at a variable-speed comprises:
  playing the second designated video frame based on the variable-speed presentation timestamp of the second designated video frame; and
  based on a time step accumulated from the variable-speed presentation timestamp of the second designated video frame, sequentially decoding video frames after the second designated video frame in the video for playback.

17. The method of claim 16, wherein based on a time step accumulated from the variable-speed presentation timestamp of the second designated video frame, sequentially decoding video frames after the second designated video frame in the video for playback comprises:
  based on a time step accumulated from a variable-speed presentation timestamp of a video frame being currently played, determining a variable-speed presentation timestamp of a next video frame, wherein the currently played video frame is the second designated video frame or a video frame after the second designated video frame in the video;
  comparing the variable-speed presentation timestamp of the next video frame with the variable-speed presentation timestamps of the first designated video frames, to determine that the variable-speed presentation timestamp of the next video frame is in a second curve interval of the speed variation curve, wherein a curve interval in the speed variation curve is an interval on the speed variation curve which is between variable-speed presentation timestamps corresponding to two adjacent video frames in the first designated video frames;
  comparing the variable-speed presentation timestamp of the next video frame with the variable-speed presentation timestamp of the fitting point of each straight line segment corresponding to the second curve interval in the one or more straight line segments, to determine a second straight line segment corresponding to the variable-speed presentation timestamp of the next video frame; and
  determining the constant-speed presentation timestamp corresponding to the next video frame based on the integral function corresponding to the second straight line segment, and acquiring a video frame corresponding to the constant-speed presentation timestamp as the next video frame for playback.

18. The method of claim 3, wherein a derivative of the speed variation curve at a position representing the first designated video frame is zero.

19. The method of claim 18, wherein fitting the speed variation curve into the one or more straight line segments comprises:
  setting fitting points on the speed variation curve using a piecewise linear interpolation algorithm or a least square method; and
  fitting the speed variation curve into one or more straight segments based on the fitting points,
  wherein one segment of the straight segment is determined by two adjacent fitting points.

20. The method of claim 19, wherein determining a variable-speed presentation timestamp of the second designated video frame based on the constant-speed presentation timestamp of the second designated video frame and the one or more straight line segments comprises:
  comparing a first cumulative integral value corresponding to the constant-speed presentation timestamp of the second designated video frame with an integral value corresponding to each curve interval of the speed variation curve, to determine a first curve interval corresponding to the constant-speed presentation timestamp of the second designated video frame, wherein the first cumulative integral value corresponds to an integral value between the first video frame in the video and the second designated video frame, and the curve interval is a curve interval on the speed variation curve which corresponds to the variable-speed presentation timestamps of two adjacent video frames in the first designated video frames;
  based on a difference between the first cumulative integral value and a second cumulative integral value in a curve interval of the speed variation curve which is before the first curve interval, determining a target integral value corresponding to the constant-speed presentation timestamp of the second designated video frame, wherein the second cumulative integral value corresponds to an integral value between the first video frame in the video and one video frame before the first curve interval, the target integral value corresponds to an integral value between the first video frame and the second designated video frame in the first curve interval;
  comparing the target integral value with the integral value corresponding to each straight line segment, which corresponds to the first curve interval, in the one or more straight line segments, to determine a first straight line segment corresponding to the constant-speed presentation timestamp of the second designated video frame; and
  determining the variable-speed presentation timestamp corresponding to the second designated video frame based on an inverse function of the integral function corresponding to the first straight line segment.

* * * * *